(12) United States Patent
Puleri et al.

(10) Patent No.: US 10,129,160 B2
(45) Date of Patent: Nov. 13, 2018

(54) TIME SLOT ALLOCATION FOR BURST SWITCHED NETWORK

(71) Applicant: Telefonaktiebolaget L M Ericsson (publ), Stockholm (SE)

(72) Inventors: Marzio Puleri, Fiano Romano (IT); Antonio D'Errico, Calci (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 391 days.

(21) Appl. No.: 14/766,534

(22) PCT Filed: Feb. 8, 2013

(86) PCT No.: PCT/EP2013/052572
§ 371 (c)(1),
(2) Date: Aug. 7, 2015

(87) PCT Pub. No.: WO2014/121843
PCT Pub. Date: Aug. 14, 2014

(65) Prior Publication Data
US 2015/0372931 A1    Dec. 24, 2015

(51) Int. Cl.
*H04L 12/841*  (2013.01)
*H04Q 11/00*  (2006.01)
(Continued)

(52) U.S. Cl.
CPC ........ *H04L 47/283* (2013.01); *H04L 41/0896* (2013.01); *H04L 47/2441* (2013.01);
(Continued)

(58) Field of Classification Search
CPC .............. H04J 14/0212; H04J 14/0227; H04Q 11/0066; H04Q 11/0005;
(Continued)

(56) References Cited

U.S. PATENT DOCUMENTS 7,370,096 B2 * 5/2008 Gous .................. H04L 41/0813
709/221
7,535,841 B1 * 5/2009 Beshai ................. H04L 49/103
370/230.1

(Continued)

OTHER PUBLICATIONS

"Guard band." Focal Dictionary of Telecommunications, Focal Press, Xerxes Mazda, and F. F. Mazda, Routledge, 1st edition, 1999. Credo Reference, https://search.credoreference.com/content/entry/bhfidt/guard_band/0?institutionId=743. Accessed Mar. 5, 2018.*

(Continued)

*Primary Examiner* — David Payne
*Assistant Examiner* — Tanya Motsinger
(74) *Attorney, Agent, or Firm* — Murphy, Bilak & Homiller, PLLC

(57) ABSTRACT

Anode for burst switching of traffic flows in an optical network switches bursts of traffic flows in different time slots. Time slots are allocated (96) so that a time gap between successive allocated time slots is selected according to a jitter specification of the traffic flow. A map of the allocations controls a burst switch to pass the bursts in their allocated time slots (86). By making the time gap between allocated time slots for successive bursts selectable, the jitter can be controlled more precisely, or the proportion of time slots filled can be increased resulting in better utilization of available bandwidth. The allocation can be made hop by hop. The map can be generated in a distributed and duplicated manner at each node. The allocation can be updated to adapt to changes bandwidth demands.

13 Claims, 17 Drawing Sheets

(51) Int. Cl.
*H04L 12/24* (2006.01)
*H04L 12/851* (2013.01)
*H04J 14/02* (2006.01)

(52) U.S. Cl.
CPC ..... *H04Q 11/0005* (2013.01); *H04Q 11/0066* (2013.01); *H04J 14/0212* (2013.01); *H04Q 2011/0016* (2013.01); *H04Q 2011/0033* (2013.01); *H04Q 2011/0086* (2013.01)

(58) Field of Classification Search
CPC ... H04Q 2011/0016; H04Q 2011/0033; H04Q 2011/0064; H04Q 2011/0086; H04L 41/0813; H04L 41/0816
See application file for complete search history.

(56) References Cited

U.S. PATENT DOCUMENTS

| | | | | |
|---|---|---|---|---|
| 7,830,914 | B1* | 11/2010 | Chmara | H04J 3/1682 370/395.41 |
| 2001/0017866 | A1* | 8/2001 | Takada | H04Q 11/0003 370/535 |
| 2003/0091165 | A1* | 5/2003 | Bearden | H04L 41/0213 379/88.08 |
| 2004/0022248 | A1 | 2/2004 | Yuang et al. | |
| 2004/0028405 | A1* | 2/2004 | Unitt | H04B 10/272 398/32 |
| 2004/0208544 | A1* | 10/2004 | Ovadia | H04Q 11/0066 398/47 |
| 2005/0041682 | A1* | 2/2005 | Kramer | H04Q 11/0067 370/458 |
| 2005/0163149 | A1* | 7/2005 | Unitt | H04Q 11/0067 370/442 |
| 2006/0147207 | A1 | 7/2006 | Den Hollander et al. | |
| 2008/0165766 | A1* | 7/2008 | Synnergren | H04L 12/66 370/352 |
| 2008/0259950 | A1* | 10/2008 | Visa | H04L 12/2803 370/458 |
| 2008/0298805 | A1* | 12/2008 | Lee | H04J 14/0227 398/48 |
| 2010/0027415 | A1* | 2/2010 | So | H04L 43/0811 370/225 |
| 2012/0082452 | A1 | 4/2012 | Yang et al. | |
| 2013/0022354 | A1* | 1/2013 | Indre | H04Q 11/0005 398/48 |
| 2013/0201826 | A1* | 8/2013 | Testa | H04L 47/10 370/230 |
| 2015/0372931 | A1* | 12/2015 | Puleri | H04Q 11/0066 398/47 |
| 2016/0094398 | A1* | 3/2016 | Choudhury | H04L 45/42 370/254 |

OTHER PUBLICATIONS

"Frame." Hargrave's Communications Dictionary, Wiley, Frank Hargrave, Wiley, 1st edition, 2001. Credo Reference, https://search.credoreference.com/content/entry/hargravecomms/frame/0?institutionId=743. Accessed Mar. 5, 2018.*

Angelopoulos, J. D. et al., "An Optical Network Architecture with Distributed Switching Inside Node Clusters Features Improved Loss, Efficiency and Cost", Journal of Lightwave Technology, vol. 25, No. 5, May 2007, pp. 1-9.

Elwalid, A. et al., "A New Approach for Allocating Buffers and Bandwidth to Heterogeneous, Regulated Traffic in an ATM Node", IEEE Journal on Selected Areas in Communications, vol. 13, No. 6, Aug. 1995, pp. 1115-1127.

Farahmand, F. et al., "Look-Ahead Window Contention Resolution in Optical Burst Switched Networks", Workshop on High Performance Switching and Routing (HPSR 2003), IEEE, Jun. 24-27, 2003, pp. 147-151.

Herzog, M. et al., "Metropolitan Area Packet-Switched WDM Networks: A Survey on Ring Systems", IEEE Communications Surveys, Second Quarter 2004, vol. 6, No. 2, 2004, pp. 2-20.

Simsarian, J. et al., "IPTV Bandwidth Demands in Metropolitan Area Networks", Bell Laboratories, Alcatel-Lucent, Holmdel, NJ 07733, Jun. 2007, pp. 1-15.

White, I. M. et al., "A Summary of the HORNET Project: A Next-Generation Metropolitan Area Network", IEEE Journal on Selected Areas in Communications, vol. 21, No. 9, Nov. 2003, pp. 1478-1494.

* cited by examiner

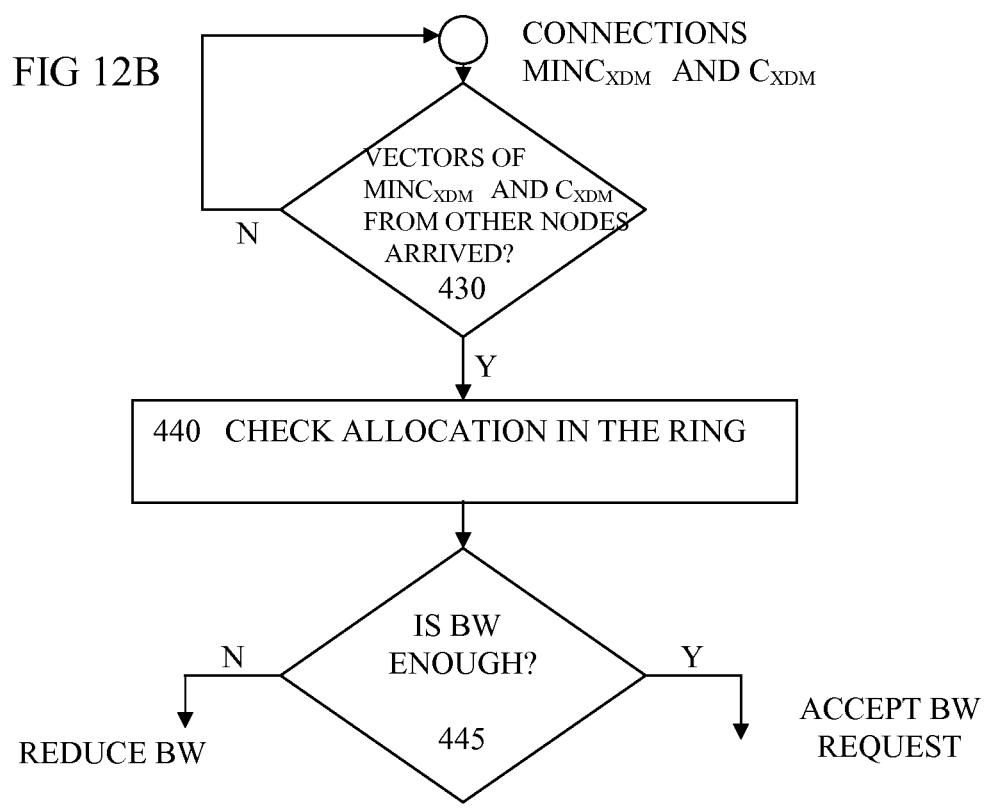

FIG 13

```
GUARANTEED TRAFFIC
ALLOCATION BEGINS
        │
        ▼
┌────────────────────────────────────────────────────┐
│ START FROM MATRIX IN TIME 0(T0)              450   │
└────────────────────────────────────────────────────┘
        │
        ▼
┌────────────────────────────────────────────────────┐
│ ORDER ACTIVE FLOWS IN DECREASING DISTANCE FROM     │
│ DESTINATIONS                                 460   │
└────────────────────────────────────────────────────┘
        │
        ▼
┌────────────────────────────────────────────────────┐
│ FOR EACH FLOW COMPUTE BURST SIZE CONSIDERING DESIRED│
│ TIME GAP OR EQUI-DISTRIBUTING FLOW BURSTS ALONG FRAME 470 │
└────────────────────────────────────────────────────┘
        │
        ▼
┌────────────────────────────────────────────────────┐
│ TotGapi=c-EffBWi       DESIRED gapGi<Mjiti    480  │
└────────────────────────────────────────────────────┘
        │
        ▼
┌────────────────────────────────────────────────────┐
│ NGi <= totGapi /Mjiti = (c-EffBWi) / Mjiti         │
│ NUMBER OF GAPS – NUMBER OF BURSTS FOR FLOW i  490  │
└────────────────────────────────────────────────────┘
        │
        ▼
┌────────────────────────────────────────────────────┐
│ NBi = NGi NUMBER OF BURSTS FOR FLOW i              │
│ BSi = EffBWi / NBi  BURST SIZE FLOW i         500  │
└────────────────────────────────────────────────────┘
        │
        ▼
┌────────────────────────────────────────────────────┐
│ DIVIDE EACH FLOW i IN NBi SUB-FLOWS OF SIZE BSi 510│
└────────────────────────────────────────────────────┘
        │
        ▼
┌────────────────────────────────────────────────────┐
│ ORDER SUBFLOWS IN INVERSE SIZE ORDER         520   │
└────────────────────────────────────────────────────┘
        │
        ▼
┌────────────────────────────────────────────────────┐
│ ASSIGN EACH SUBFLOW TO A SET OF CONSECUTIVE SLOTS, │
│ IF NOT POSSIBLE USE THE FIRST AVAILABLE SLOT  530  │
└────────────────────────────────────────────────────┘
        │
        ▼
┌────────────────────────────────────────────────────┐
│ ASSIGN FOLLOWING SUBFLOWS TO CONSECUTIVE ROW OF SLOTS│
│ (MACHINES) STARTING FROM THE LAST USED COLUMN POSITION│
│ PLUS THE NEXT GAP (IN THIS PHASE THE MATRIX IS CONSIDERED AS│
│ CIRCULAR                                      540  │
└────────────────────────────────────────────────────┘
        │
        ▼
┌────────────────────────────────────────────────────┐
│ PROJECT FORWARDS AND BACKWARDS THE ASSIGNED SLOTS IN│
│ OTHER STATUS MATRICES (UP TO DESTINATION AND SOURCE│
│ NODES RESPECTIVELY)                           550  │
└────────────────────────────────────────────────────┘
        │
        ▼
┌────────────────────────────────────────────────────┐
│ MOVE TO NEXT TIME INSTANT (NODE); REPEAT AVOIDING  │
│ USAGE OF ALREADY ASSIGNED SLOTS               560  │
└────────────────────────────────────────────────────┘
        │
        ▼
   CONTINUES IN FIG 14
```

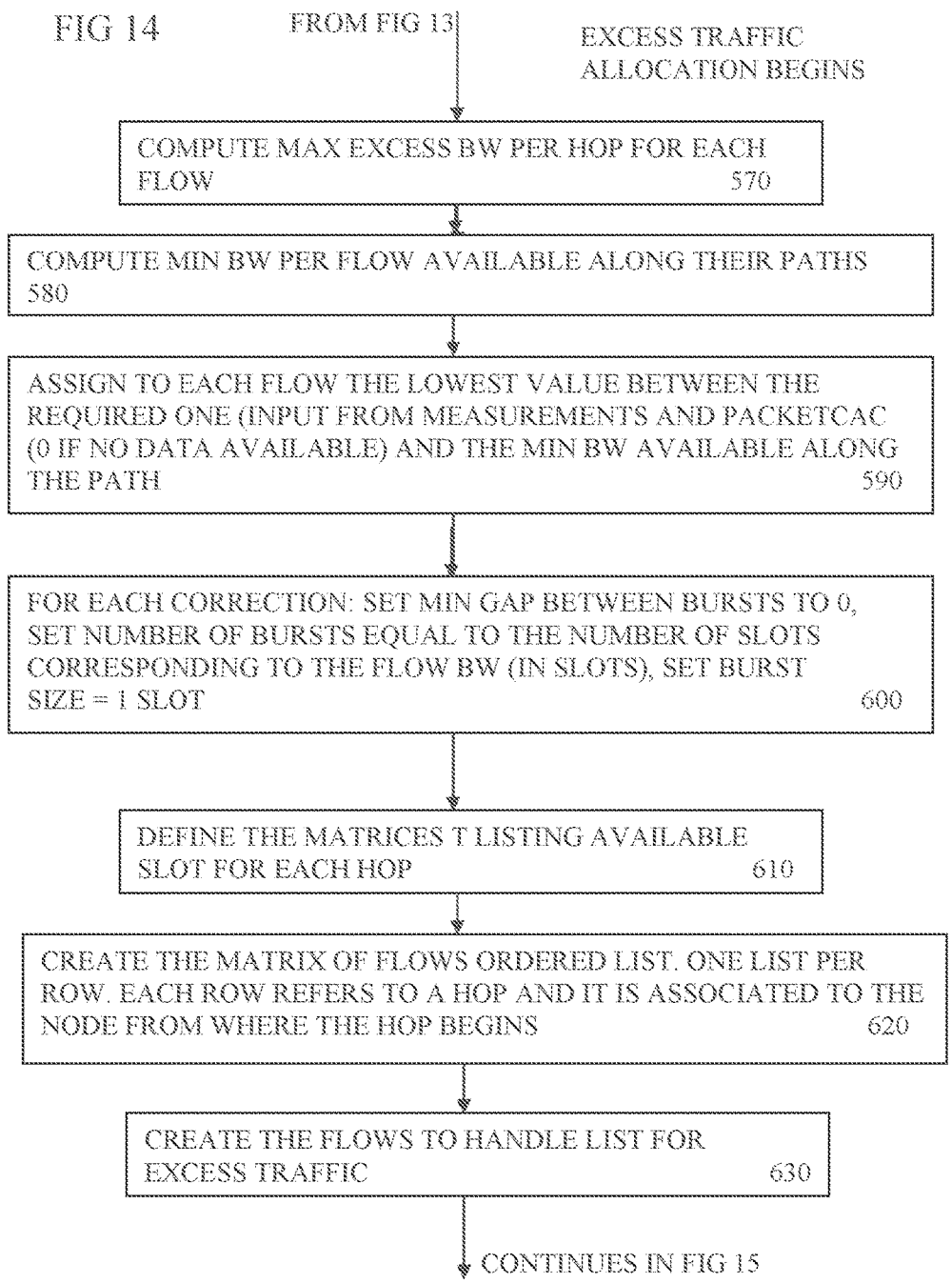

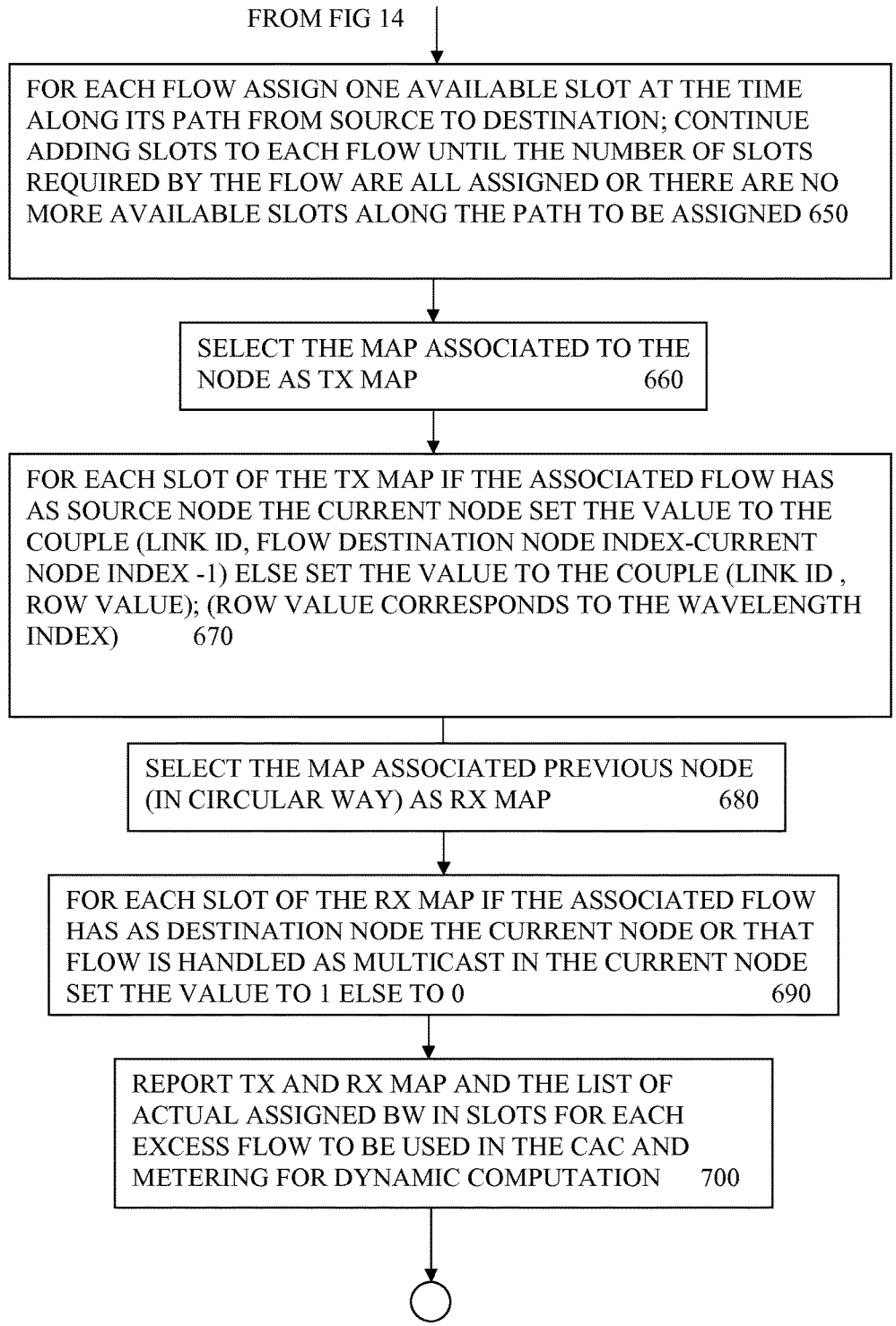

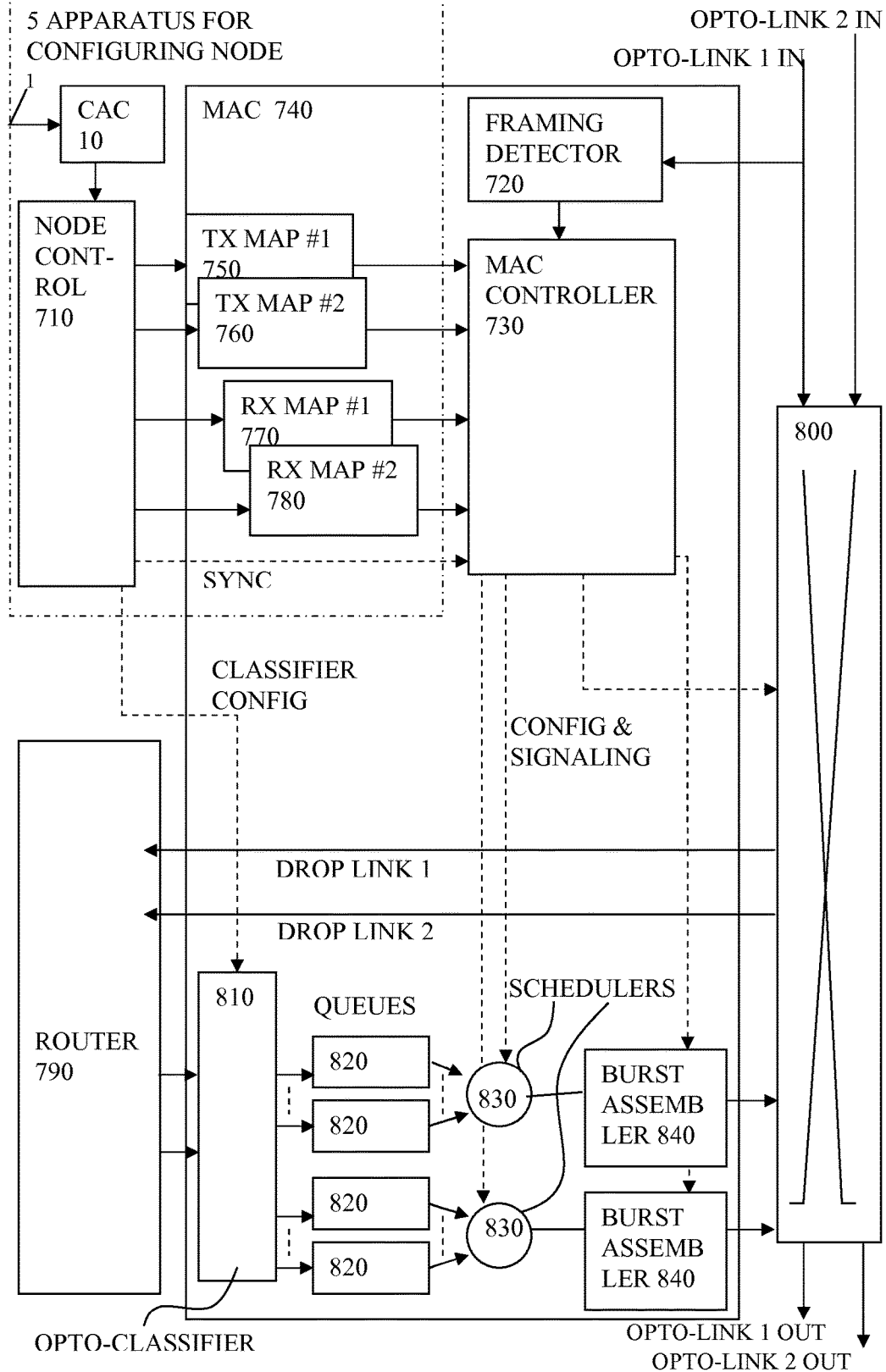

TIME SLOT ALLOCATION FOR BURST SWITCHED NETWORK

FIELD

The present invention relates to methods of configuring nodes for burst switching, to apparatus for configuring a node, to optical networks, and to corresponding computer programs.

BACKGROUND

Statistical multiplexing at optical level provides a theoretical gain in terms of transmission resources exploitation respect to traditional circuit based WDM rings. However its performance is strongly affected by the mechanisms adopted for bandwidth allocation in real time to the different services at both node and network levels. Typically the bandwidth assigned to guaranteed traffic is pre and over provisioned causing a relevant waste of optical resources. For the best effort quote of the traffic typically the queues status in the nodes is used to allocate the optical bandwidth. Fast methods, like "one-way reservation", cause collisions and consequent retransmission, while collisionless techniques, like "two way reservation", take milliseconds to take a decision and are generally processing consuming. Both approaches can lead to relevant delays, put restrictive constraints on wavelengths use in the ring and can be unfair in resources allocation, providing efficiency slightly better if compared to circuit based WDM rings. As a consequence, nowadays optical statistical multiplexing is difficult to apply in telecom-grade networks and for cloud computing applications that are the emerging fields for this technology.

Ring networks are a primary choice for fiber-based metropolitan area networks (MAN), because they minimize fiber deployment costs, and simplify routing, control, and management issues. In the last years, new applications and services, such as video on demand (VoD), video broadcasting, and IP telephony, are significantly changing MAN traffic characteristics, in terms of both required bandwidth and quality of service (QoS) assurance. In the future, video-related traffic will exceed best effort traffic in terms of required bandwidth, hence the interest of many network operators to effectively accommodate QoS traffic in their MANs. This means providing different latency and priority characteristics to the different classes of service supported.

Optical burst switching is an alternative to traditional circuit based WDM networks. It can allow a better exploitation of bandwidth resources (up to 70% if compared to circuit solutions), introducing statistical multiplexing at optical level. However, this technology needs efficient real-time dynamic bandwidth allocation mechanisms at both node and network level to both maximize bandwidth exploitation and keep QoS constraints satisfied.

Performance of optical burst switching solutions are strongly affected by the mechanisms adopted for bandwidth allocation in real time to the different services at both node and network level. Several bandwidth allocation schemes are available in existing literature. Bandwidth allocation relies on two main mechanisms: Connection Admission Control (CAC) and the Media Access Control (MAC). The first determines the effective bandwidth needed at network level by each service to satisfy its QoS. The second controls the runtime bandwidth allocation at node level in coordination with the other nodes in the network in order to satisfy services' demands as they change from time to time. Literature and products refer to a series of methods trying to support bandwidth allocation in the most efficient way. CAC is typically not treated or is primitive (e.g. bandwidth assigned to a connection in a pre-provisioned way guessing the needed guaranteed bandwidth). MAC consists of a control part located in the nodes, handling the local scheduling of traffic according to a specified policy, and a protocol part used to exchange information among the nodes to allow nodes decision when to transmit into the ring. The transmission of the control information is typically out of band, using an extra wavelength.

Among the various known MAC control strategies some examples are as follows:
- CSMA/CA Carrier sense multiple access with collision avoidance.
- Wavelength availability information on control channel.
- Two way reservation technique.
- Pre-provisioning and exchange of information on excess available BW with CA.

Such techniques mean that CAC is usually not defined and a guessed guaranteed bandwidth is reserved. Depending on the MAC mechanism adopted, there can be data losses triggering retransmissions, or if lossless, they introduce a significant delay on traffic equal to the RTT of the ring (typically 1 or more milliseconds).

SUMMARY

Embodiments of the invention provide improved methods and apparatus. According to a first aspect of the invention, there is provided a method of configuring a node for burst switching of traffic flows in an optical network based on indications relating to a traffic flow to be scheduled comprising at least an indication of a destination node and of a jitter specification for the traffic flow. The traffic flow comprises a series of bursts, and the method involves allocating bursts of that traffic flow to time slots of at least one optical network frame having a destination corresponding to the indicated destination node of the traffic flow, wherein a time gap between successive allocated time slots is selected according to the jitter specification of the traffic flow. The node can then be configured before the traffic flow arrives at the node, to enable the node to switch the bursts towards the respective destination node in their allocated time slots.

A benefit of the time gap between allocated time slots for successive bursts being selectable is that the jitter can be controlled more precisely, or the proportion of time slots filled can be increased resulting in better utilisation of available bandwidth, or a better trade off can be achieved between such jitter control and such utilisation. This is particularly useful to handle efficiently multiple types of traffic with different jitter specifications. These benefits can apply whether the allocation is calculated centrally or locally, and regardless of whether there are multiple wavelengths or a single wavelength, and regardless of whether the allocation is done for a single hop to the destination or multiple hops.

Any further features can be added to this set of features, or disclaimed from the set. Some such additional features are set out in dependent claims and described in more detail. One such additional feature is the subsequent step of repeatedly adapting the allocation of the bursts of that traffic flow and allocations of bursts of other existing traffic flows in the optical network. A benefit of repeated adaptation of the allocations is that there is less need to allocate over provisioning of bandwidth to cater for dynamic variations in bandwidths of traffic flows, thus utilisation can be improved.

Another such additional feature is the step of: receiving an indication of a desired bandwidth for the traffic flow, wherein the step of allocating comprises: selecting time slots in a given time period to allocate, and selecting optical wavelengths to be used, according to the desired bandwidth. A benefit of allocating according to bandwidth is that this can enable dynamic variations in bandwidth to be indicated and allocated more conveniently and efficiently.

Another such additional feature, where the traffic flow is routed over more than one hop via an intermediate node to reach the destination node, is that the step of allocating comprises allocating time slots for each of the hops. A benefit of allocating per hop is that each hop can be optimised more conveniently and efficiently. Thus overall utilisation can be improved. This benefit can be useful independently of the jitter control.

Another such additional feature is a step of providing optical termination and regeneration at the intermediate nodes. A benefit of this is that different wavelengths can be used for different hops, by the same burst or by the same traffic flow.

Another such additional feature is the allocating being distributed and duplicated at multiple nodes of the optical network by having a step at the node of generating maps of allocated time slots for traffic flows at the node and for traffic flows at others of the nodes, and having the step of generating duplicate maps at the others of the nodes. A benefit of such distributed and duplicated allocation is that the delays involved in sending the allocations between nodes from wherever they are calculated to where they are implemented, can be avoided, and the amount of signalling between nodes can be reduced. Thus latency can be reduced, which has the consequence that jitter can also be reduced. This benefit can be useful independently of the jitter control.

Another such additional feature is the generating of the maps comprising allocating time slots relating to traffic flows of a selected reference one of the nodes, then allocating time slots for these same traffic flows in the maps for respective nodes upstream and downstream of the reference node, and then repeating these steps for traffic flows of another of the nodes in a predetermined order while avoiding time slots already allocated. A benefit of such an order of the allocating is that the duplicate maps can be generated to be identical in the different nodes without the need for signalling between nodes so as to avoid latency or to reduce signalling or to enable good utilisation more conveniently and efficiently.

Another such additional feature is the steps of dividing the traffic flow into bursts and selecting a burst size according to the selected time gap. A benefit of selecting a burst size is that effects on latency and jitter can be controlled. Also the utilisation of time slots can be improved, particularly if there are traffic flows with different bandwidth requirements, or a better trade off of such different benefits can be obtained.

Another such additional feature is having an admission control procedure having steps of determining if there is sufficient bandwidth in packet switches at ingress and egress to the optical network, and if there is sufficient bandwidth within the optical network. A benefit of such admission control is that the constraints of the optical network can be passed effectively to the packet network. This can help enable the utilisation of the optical network to be pushed to its limits since there is provision for managing the traffic flows when those limits are reached, thus there is less need for over provisioning in the optical network.

Another aspect of the invention provides apparatus for configuring a node for optical burst switching of traffic flows in an optical network, the apparatus having: an input configured to receive indications relating to a traffic flow to be scheduled comprising at least an indication of a destination node and of a jitter specification for the traffic flow, and the traffic flow comprising a series of bursts. A processor is provided configured to allocate bursts of that traffic flow to time slots of at least one optical network frame having a destination corresponding to the indicated destination node of the traffic flow, wherein the processor is configured to select a time gap between successive allocated time slots according to the jitter specification of the traffic flow. The node can then be configured, before the traffic flow arrives at the node, to enable the node to switch the bursts towards the respective destination node in their allocated time slots.

Another such additional feature is the processor being configured to adapt repeatedly the allocation of the bursts of that traffic flow and allocations of bursts of other existing traffic flows in the optical network.

Another such additional feature is the apparatus being configured to receive an indication of a desired bandwidth for the traffic flow and to select how many of the time slots in a given time period to allocate, and to select which optical wavelengths are to be used, according to the desired bandwidth.

Another such additional feature, where there are multiple hops via intermediate nodes to reach the destination node, is the processor being configured to allocate time slots for each of the multiple hops, the intermediate nodes being arranged to provide optical termination and regeneration.

Another aspect provides an optical network having multiple nodes each having apparatus as set out above, the allocating being distributed and duplicated at the multiple nodes, the nodes each being configured to generate maps of allocated time slots for their traffic flows and for traffic flows of others of the nodes, to provide duplicate maps at the nodes for use in optical burst switching of the traffic flows.

Another aspect provides a computer program having instructions on a computer readable medium which when executed by a processor cause the processor to carry out the above methods.

Another aspect provides a method of configuring a node for optical burst switching of traffic flows in an optical network based on indications relating to a traffic flow to be scheduled and comprising at least an indication of a destination node and of a routing of at least two hops via an intermediate node. The traffic flow comprises a series of bursts, and the bursts of that traffic flow are allocated to time slots for each of the hops, the time-slots being of at least one optical network frame having a destination corresponding to the indicated routing of the traffic flow. Then the node can be configured, before the traffic flow arrives at the node, to enable the node to switch the bursts towards the respective destination node in their allocated time slots. A benefit of allocating per hop is that each hop can be optimised more conveniently and efficiently. Thus overall utilisation can be improved. This benefit can be useful independently of the jitter control.

Another aspect provides a method of configuring a node for optical burst switching of traffic flows in an optical network based on indications relating to a traffic flow to be scheduled comprising at least an indication of a destination node, the traffic flow comprising a series of bursts. The bursts of that traffic flow are allocated to time slots of at least one optical network frame having a destination corresponding to the indicated routing of the traffic flow. Then the node is configured, before the traffic flow arrives at the node, to enable the node to switch the bursts towards the respective destination node in their allocated time slots. The allocating is distributed and duplicated at multiple nodes of the optical network by generating maps at the node of allocated time slots for traffic flows at the node and for traffic flows at others of the nodes. There is also a step of generating duplicate maps at the others of the nodes.

A benefit of such distributed and duplicated allocation is that the delays involved in sending the allocations between nodes from wherever they are calculated to where they are implemented, can be avoided, and the amount of signalling between nodes can be reduced. Thus latency and the jitter can be reduced. This benefit can be independent of the jitter control or of the per hop allocation features.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIGS. 12A and 12B show flow charts of steps in an admission process for use with embodiments, FIGS. 13 to 15 shows a flow chart of steps of a method according to an embodiment, FIG. 16 shows a schematic view of a node according to an embodiment.

DETAILED DESCRIPTION

Figure 1:
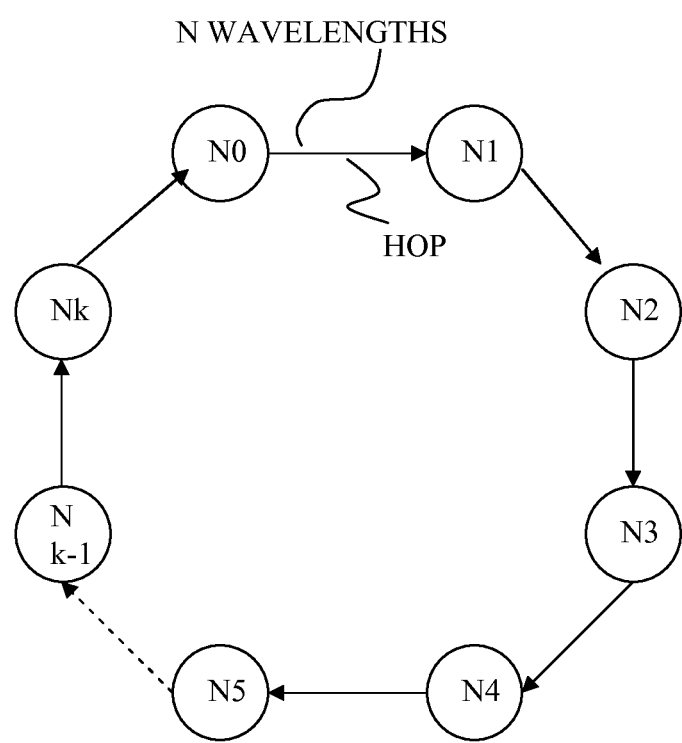
FIG. 1 shows a schematic view of a ring network.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

Abbreviations
BE Best Effort
CA Collision Avoidance
CAC Connection Admission Control
CBR Constant Bit Rate
CBS Committed Burst Size
CIR Committed Information Rate
CoS Class of Service
CSMA/CA Carrier Sense Multiple Access with Collision Avoidance
EB Effective Bandwidth
IP Internet Protocol
IPTV Internet Protocol TeleVision
LTE Long Term Evolution
MAC Media Access Controller
MAN Metropolitan Area Network
NRT Not Real Time
OEO Optical-Electrical-Optical
OOO Optical-Optical-Optical (all optical)
PIR Peak information Rate
RT Real Time
RTT Round Trip Time
QoS Quality of Service
VBR Variable Bit Rate
VoD Video on Demand
WDM Wavelength Division Multiplexing
WRR Weighted Round Robin Definitions Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described, nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to particular level of integration, or size or bandwidth or bit rate and so on.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Introduction to Some Notable Features of the Embodiments

By way of introduction to the embodiments, some notable features will be explained, and how they address some issues with conventional designs will be explained. Some embodiments can be implemented as a node for a ring network using novel dynamic bandwidth allocation using time slots. In some embodiments there are features applied at a network level and in some embodiments such bandwidth allocation is applied at a node level. A feature of some embodiments is that the allocation is of time slots. This means that a frame, divided into timeslots travels through the network or along the ring in the case of a ring network. Framing can be applied to all the used wavelengths. Features of embodiments include associating or mapping slots to packet traffic and updating the mapping repeatedly in a dynamic way and in real time to adapt to changes in real traffic demands. These features can enable any or all of the following benefits: optimized bandwidth exploitation, preservation of different QoS of the different traffic flows, and controlling in a programmable way the jitter/latency introduced on traffic by nodes.

Another notable feature is a novel dynamic CAC functionality for a distributed management of resources at a network level. This can be combined with a dynamic MAC for the runtime bandwidth allocation at node level. The CAC can be implemented using a heuristic approach for slot allocation. The dynamic CAC can use traffic measurements to perform a first estimate of the bandwidth to be allocated, then can allocate the traffic slots to the different traffic flows according to a new heuristic and then adjust bandwidth allocation according to a current mapping in the frame. After doing this for guaranteed traffic flows, it can allocate best effort traffic flow requests (quotes) with a fair distribution policy among all these traffic flows.

Connections having the same destination can be grouped into the same traffic flow, thus reducing the number of traffic flows to be processed, to simplify the allocation process. Each allocation is maintained stable for a time interval compatible with a correlation time window of self-similar traffic sources (order of magnitude: 1 second). Then a new allocation is computed. In this way collisions can't occur and latency in the network is not affected by bandwidth allocation computation, since traffic transmission and bandwidth allocation proceed in parallel and are uncorrelated operations. This approach can help reduce computation and signalling resource requirements. The latter can be reduced to one packet per allocation update.

In some embodiments the allocation calculations can be carried out centrally, in other embodiments they can be carried out in a novel distributed and duplicated manner as follows. The signalling packet can be sent in multicast from each node to all the others. Each signalling packet can contain the aggregated bandwidth required by each flow related to that node, as estimated by the CAC at that node. Each node collects these signalling packets having bandwidth needs of all the nodes in the network. Each node can compute the new mapping of allocations for all flows in parallel with the same computation in all other nodes. Since all nodes process the same information, they all determine the same hop by hop frame mappings. This can avoid any delays involved in sending out the mapping from a central location to all the nodes, and thus enable more rapid adaptation to real time changes in traffic demands. Also it can save on signalling resource required, since there is typically much more data involved in sending mappings than in sending traffic flow bandwidth needs.

In some embodiments the allocations are carried out hop by hop rather than end to end. This can enable the reuse of wavelengths and slots by different traffic flows on different hops in order to maximize bandwidth exploitation.

The dynamic MAC in each node can be implemented as circuitry for controlling runtime bandwidth allocation at node level, according to the latest allocation mapping that has been computed. It can be implemented by a table with an entry for each slot where it is reported the action to be taken with that slot, namely, extract incoming data, if needed, forward data, insert new data. This is done in parallel for each wavelength at each node. The MAC data plane part can have a dedicated switching system with per flow queuing. The MAC triggers the switch outputs according to the slot allocation defined in the table and configure in the proper way the optical switch belonging to the node. Both OEO and OOO optical switches able to commute at burst/packet speed can be adopted.

Figure 2:
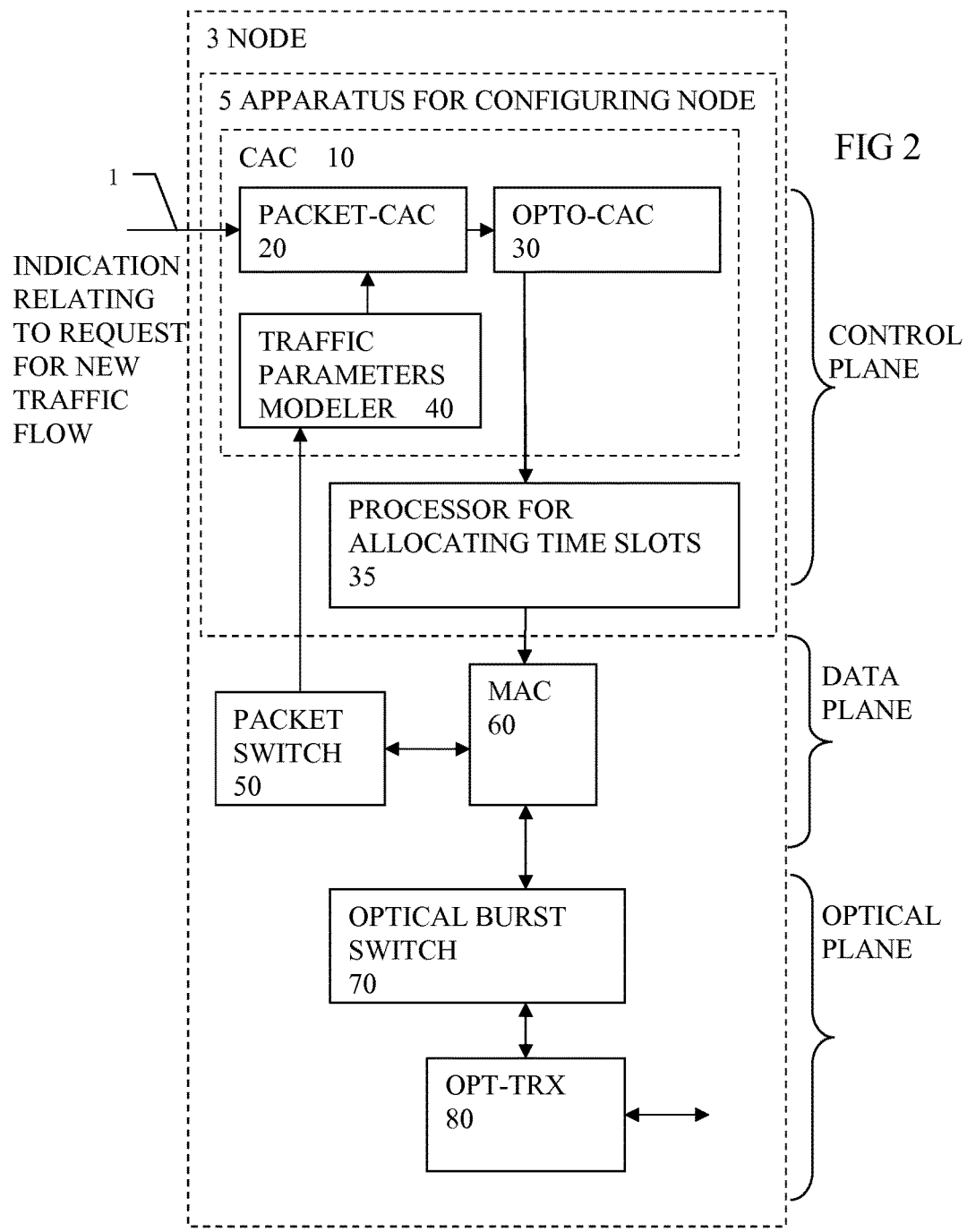
FIG. 2 shows a schematic view of a node according to an embodiment.

FIGS. 1, 2, Network and Node

An example of a ring network is shown in FIG. 1 for use as a WDM metro ring network. Nodes N0 to Nk are shown. Introducing statistical multiplexing at the optical layer, there is the need for mechanisms to control dynamically the optical bandwidth allocation, in order to avoid collisions, keep latencies under control and preserve QoS of the different traffic flows. Each node in the ring can in one implementation have the basic block architecture of the node 3 shown schematically in FIG. 2. Relating to a control plane there is a CAC 10, and a processor 35 for configuring the node by allocating time slots. This can involve generating and updating a stored mapping of traffic flows to time slots. The CAC can comprise a packet CAC 20, and an opto CAC 30. The packet CAC has an input 1 for receiving an indication of a request for a new traffic flow, with details such as for example destination, bandwidth and traffic type or more explicit jitter or latency specifications, to enable an admission decision, or optionally the input 1 can be fed direct to the processor if no CAC is provided or if no CAC decision is needed. The parts of the node which are an example of apparatus 5 for configuring the node are represented within a dotted line, in this case comprising the CAC and the processor for allocating time slots.

Relating to a data plane there is a packet switch 50 used to manage local client traffic, a Media Access Controller (MAC 60) used to control for each time slot if the current slot on the optical side contains data to be dropped and/or forwarded, based on the current allocations configured by the processor. It also coordinates transmission from the client side to the optical WDM network. Relating to an optical plane there is an optical burst switch 70 which can provide time division multiplexing of different traffic flows on the same wavelength in different time slots. This can be implemented in principle in the optical domain or the electrical domain. If an electro-optical approach for WDM traffic switching is adopted, this can provide the highest flexibility in slot management, since wavelength can be changed for a given traffic flow. This is not essential and some embodiments can provide WDM switching without wavelength changing. An optical transceiver part 80 is shown to carry out the optical to electrical and electrical to optical conversions for the case that an electrical burst switch is used.

Traffic Parameter Modeller 40

The traffic parameter modeler has the task of determining traffic characteristics on the fly for each connection having an excess quote or being pure best effort. Excess and BE are not characterized in advance and are considered unknown quantities during packet-admission in the switch. The strategy typically followed with this kind of traffic is to assign to these connections all the residual bandwidth up to saturation of the capacity. Adopting a real-time model estimator, it is possible to determine the short term evolution of the traffic characteristics of best effort components, having so the possibility of allocating the proper quantity of bandwidth to each of them.

Opto-CAC

The opto-CAC is devoted to determine the bandwidth allocation onto the ring. Each node has a copy of the opto-CAC that makes its computation on the same set of data, so that the result at each node is always consistent. This means that, once the opto-CAC has decided a bandwidth allocation, all nodes have immediate access to the same information without the need for exchanging the result among them, reducing the signalling amount.

The input to the opto-CAC is provided by all packet-CACs in the nodes of the ring. The Packet-CAC communicates its need of bandwidth as current cumulative minimum Effective Bandwidth allocation for all the interconnections between its node and all the other destination nodes, providing such information, split per internal link and multicast flow, so that the opto-CAC knows the current bandwidth distribution inside each node and can take it as a constraint.

The opto-CAC works on a periodic basis. Once it gets the information from all the packet-CAC, it computes the new bandwidth allocation, defining the distribution at both wavelength and slot level. During the computation the algorithm takes into account the current distribution of traffic on the internal links, since traffic related to the same destination node, but insisting on two different internal links inside a source node, can't use the same wavelength at the same time. It needs to use two different wavelengths instead. This is not a real limitation on the performance, since the effect of using more wavelengths at the same time from one source node to another specific destination node has the effect of creating shorter bursts.

Figure 3:
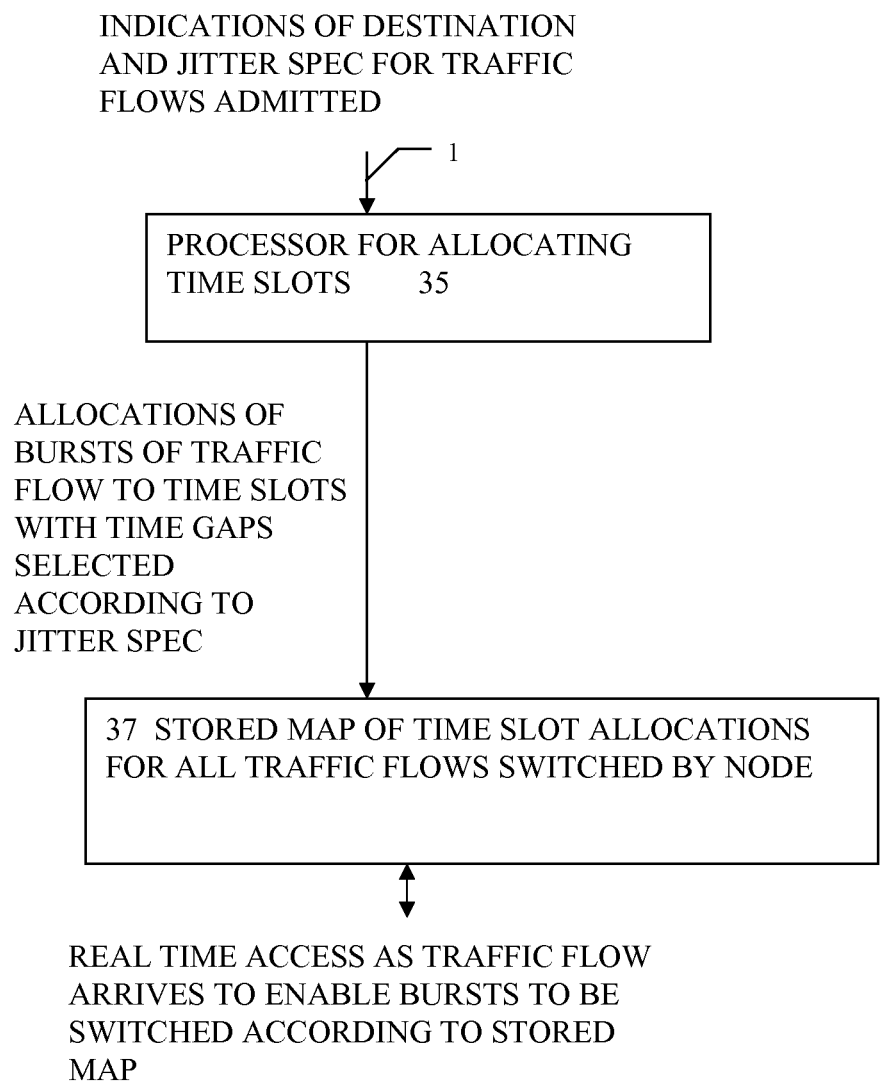
FIG. 3 shows a schematic view of parts of a node for allocating time slots according to an embodiment.

FIG. 3, Processor for Allocating Time Slots

FIG. 3 shows parts of a node relating to allocation of time slots according to an embodiment, which may be incorporated into the node of FIG. 2 or into other types of node. A processor 35 for allocating the time slots node has an input 1 for receiving indications of destination node and jitter specification for traffic flows admitted to the network. The processor has an output for outputting computed allocations to a stored map 37. The mapping can be a set of allocations of bursts of a given traffic flow to time slots, with time gaps between consecutive bursts of a given traffic flow being selected according to the jitter spec. This mapping is then available for real time access to enable the optical burst switch to be controlled to switch one of the traffic flows in a given one of the wavelengths.

Figure 4:
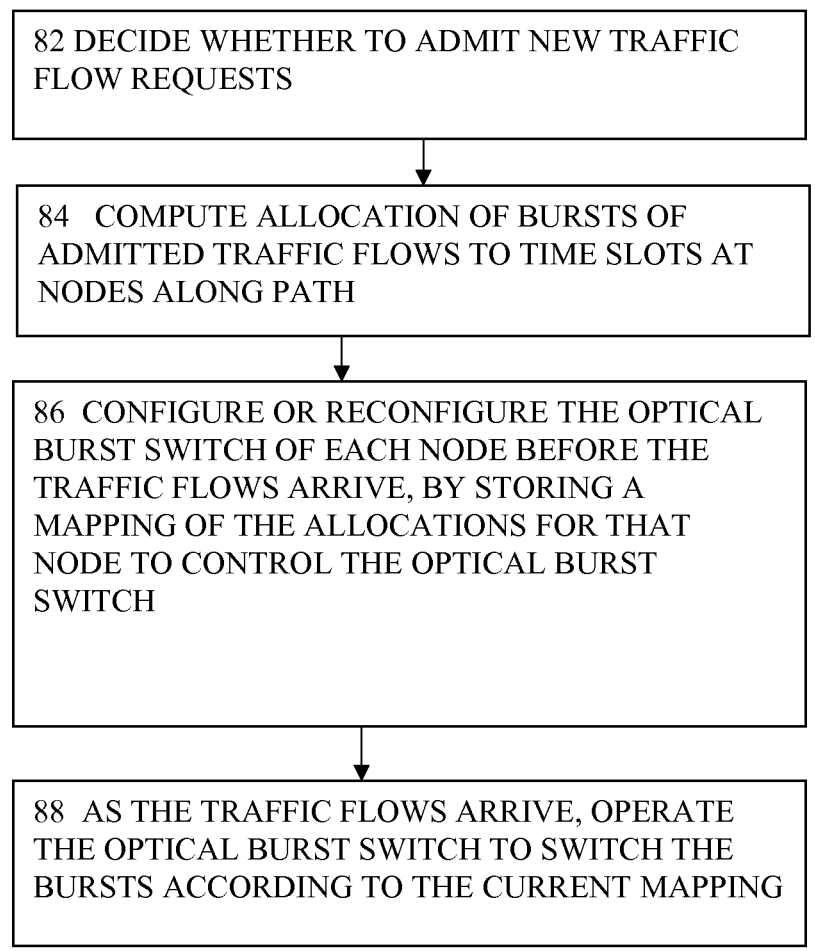
FIGS. 4 to 10 show flow charts of steps of methods according to embodiments.

FIG. 4, Operation of a Node According to an Embodiment, Overall View

FIG. 4 shows some of the steps in the operation of some embodiments of the invention having the feature of allocating bursts to time slots, to provide an overall view. At step 82 it is decided whether to admit new traffic requests, according to available capacity and other constraints. Step 84 involves computing an allocation of bursts of each admitted traffic flow to time slots at nodes along the path for each flow. Next there is a step 86 of configuring the optical burst switch of each node before the traffic flow arrives, by storing a mapping of the allocations for that node and making it available to control the optical burst switch. At step 88, as the traffic flows arrive, the optical burst switch is operated to switch the bursts according to the current mapping. The mapping can be updated repeatedly to adapt to changing bandwidth demands.

Figure 5:
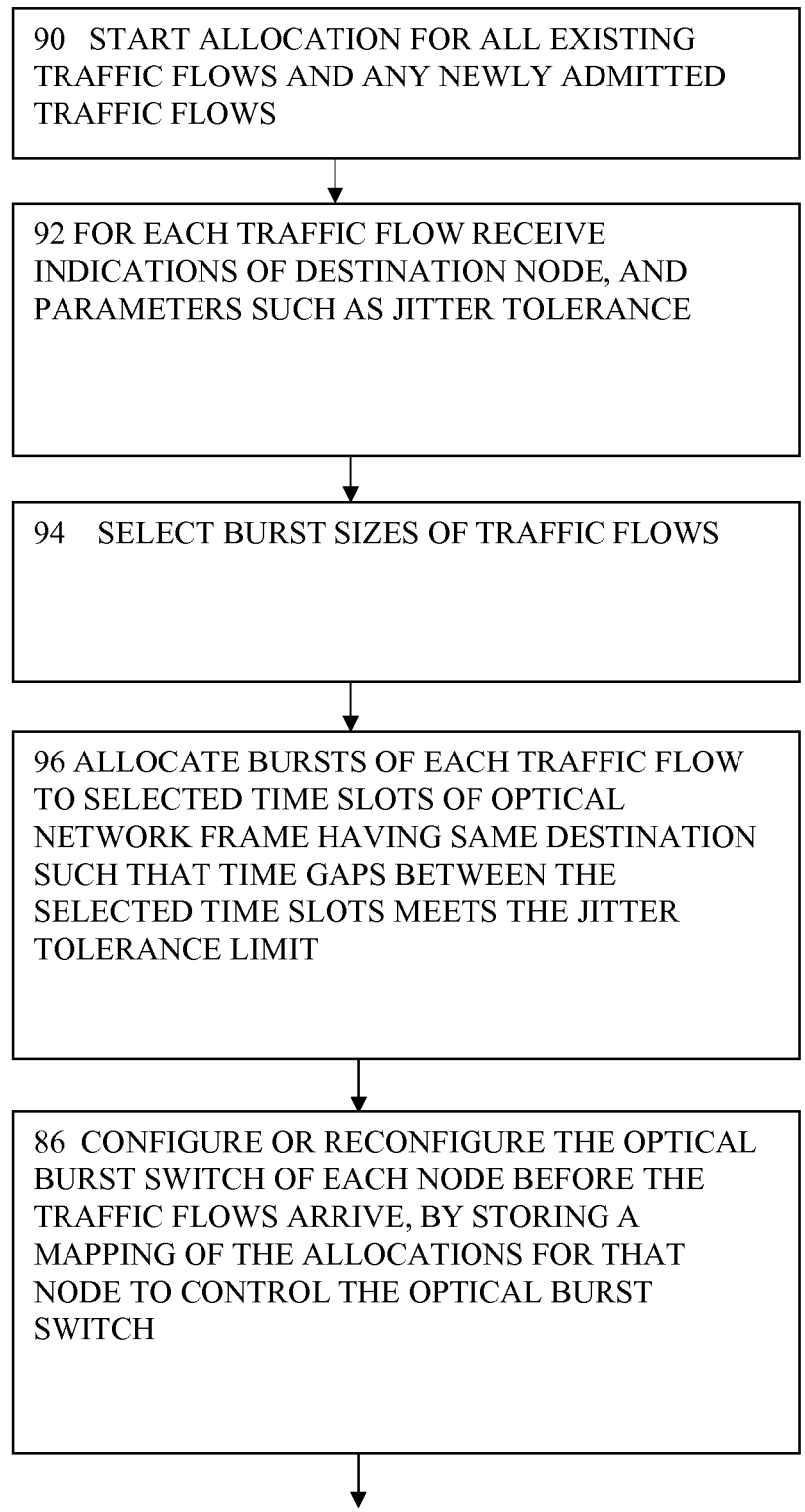

FIG. 5, Steps with Feature of Selectable Time Gaps Between Consecutive Bursts

FIG. 5 shows steps in operation of a node such as that of FIG. 2 or other embodiments. At step 90 allocation for existing and newly admitted traffic flows is started. At step 92, for each traffic flow, indications of destination node and parameters such as jitter tolerance are received. Optionally, burst sizes of traffic flows are selected at step 94. Bursts of each traffic flow are allocated to selected time slots of an optical network frame such that for consecutive bursts, time gaps between these time slots are selected according to the specified jitter tolerance limit for that traffic flow, at step 96. Then, as before, at step 86, the optical burst switch of each node is configured by storing the computed mapping of allocations and making it effectively control the optical burst switch to switch the bursts in their allocated time slots.

Figure 6:
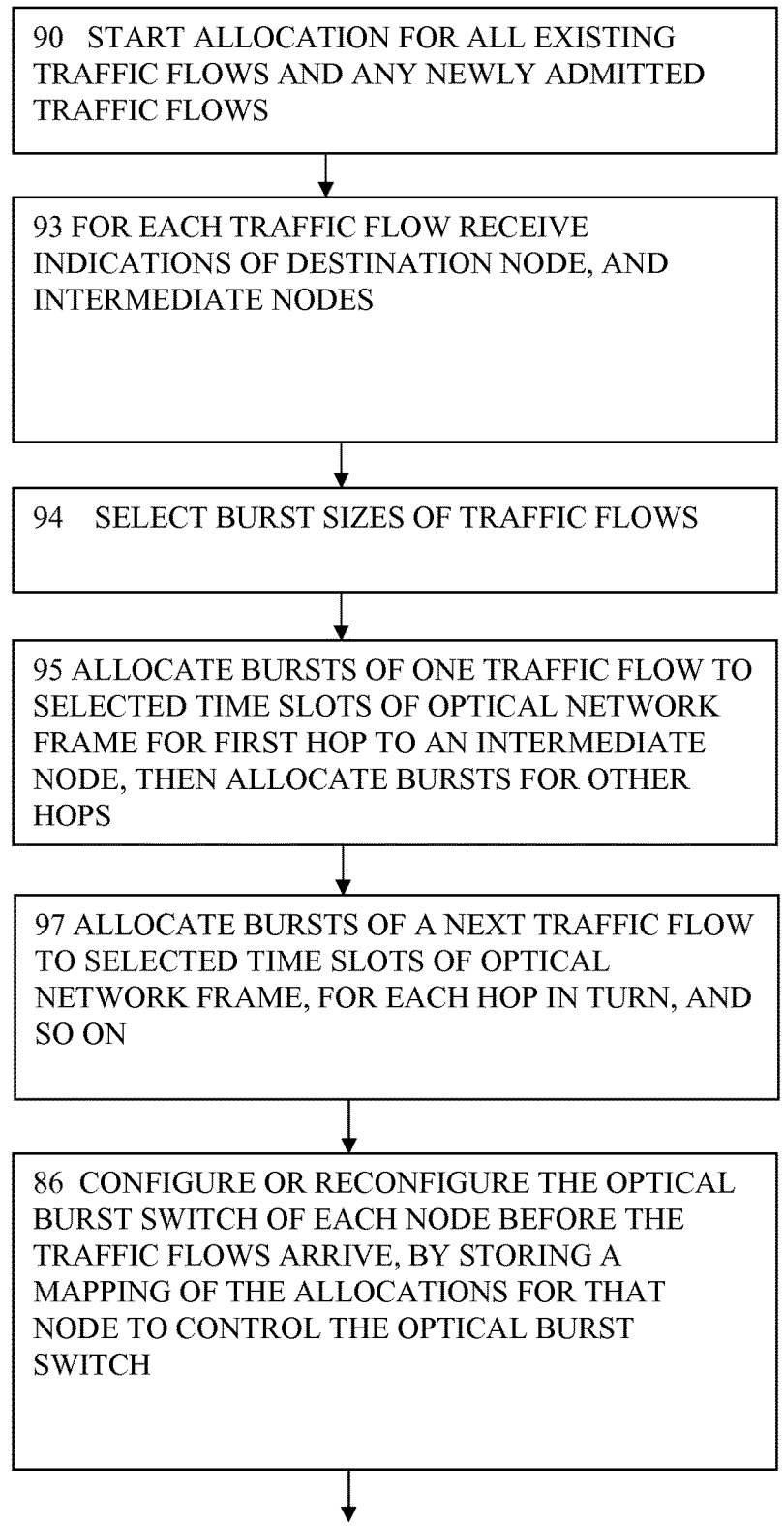

FIG. 6, Embodiment with Hop by Hop Time Slot Allocation

FIG. 6 shows steps in operation of a node such as that of FIG. 2 or other embodiments, with the feature of hop by hop time slot allocation. At step 90 allocation for existing and newly admitted traffic flows is started. At step 93, for each traffic flow, indications of destination node and intermediate nodes are received. Optionally, burst sizes of traffic flows are selected at step 94. At step 95 bursts of each traffic flow are allocated to selected time slots of an optical network frame for a first hop to a first intermediate node, then for further hops for the same traffic flow. At step 97, bursts of a next traffic flow are allocated to selected ones of the remaining time slots not previously allocated. This is done for each hop in turn of that next traffic flow. The same process is applied to further traffic flows until all are allocated. Then, as before, at step 86, the optical burst switch of each node is configured by storing the computed mapping of allocations and making it available for use in controlling the optical burst switch to switch the bursts in their allocated time slots.

Figure 7:
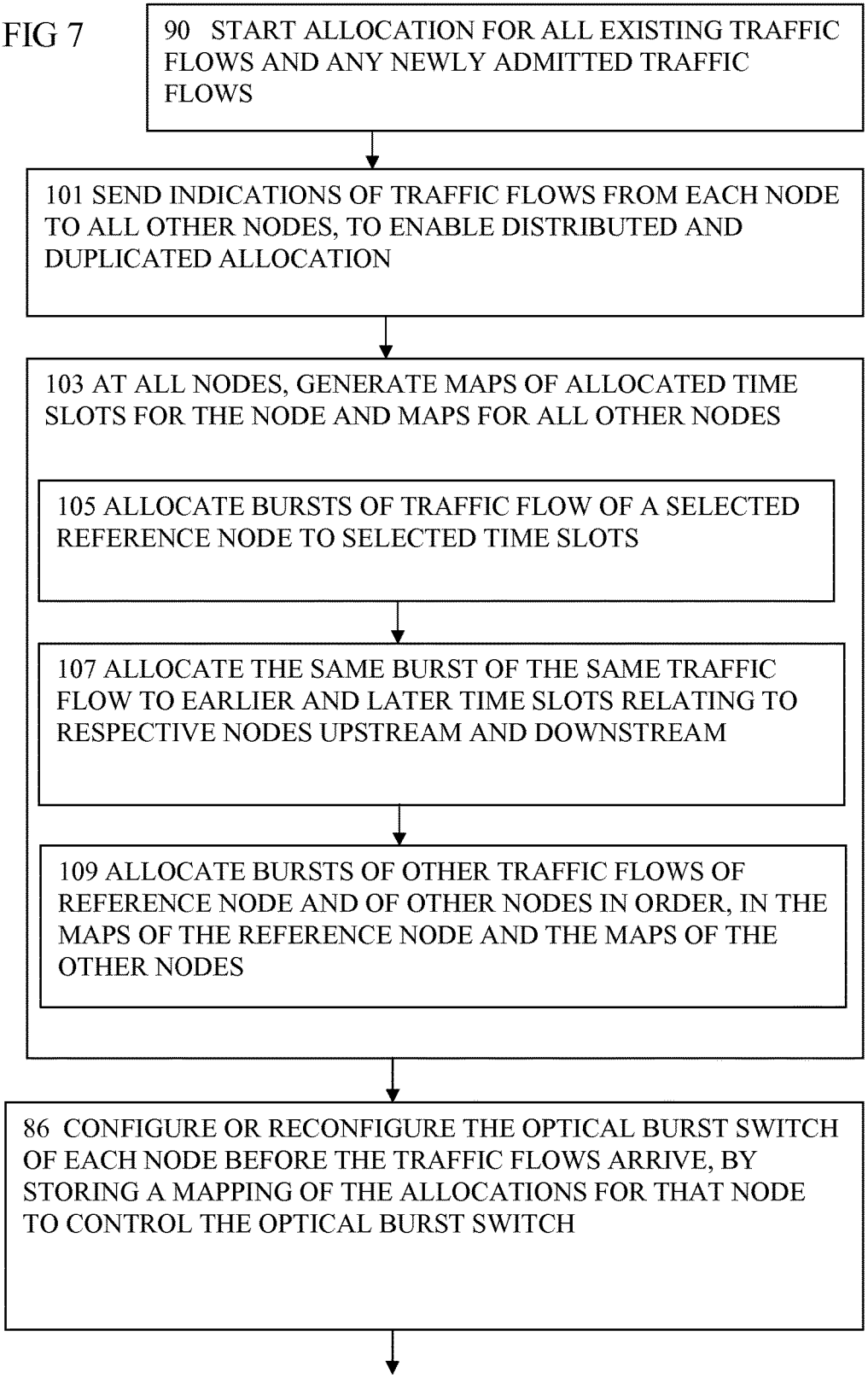

FIG. 7, Embodiment with Distributed and Duplicated Time Slot Allocation

FIG. 7 shows steps in operation of a node such as that of FIG. 2 or other embodiments, with the feature of the time slot allocation being distributed and duplicated at the nodes. At step 90 allocation for existing and newly admitted traffic flows is started. At step 101, indications of traffic flows are sent from each node to all other nodes. This indication can comprise a direct or indirect indication of bandwidth and source and destination nodes, or similar details. At step 103, at all nodes maps of allocated time slots are generated. Each of these maps includes the allocations of all the traffic flows. This can be implemented by steps 105, 107 and 109 as follows, so that all nodes generate the maps in the same way and order, so that the maps will be identical. At step 105 bursts of a first traffic flow of a selected reference node are allocated to selected time slots relating to that node. At step 107, the same burst of the same traffic flow is allocated to time slots relating to nodes upstream and downstream of the reference node, these time slots being earlier and later respectively than the first time slot. Hence a sequence of time slots for that burst is allocated from source to destination node. At step 109 the same process is carried out for other traffic flows of the reference node and then for traffic flows of other nodes, using remaining time slots. Then, as before, at step 86, the optical burst switch of each node is configured by storing the computed mapping of allocations for that node and making it available for use in controlling the optical burst switch to switch the bursts in their allocated time slots.

Figure 8:
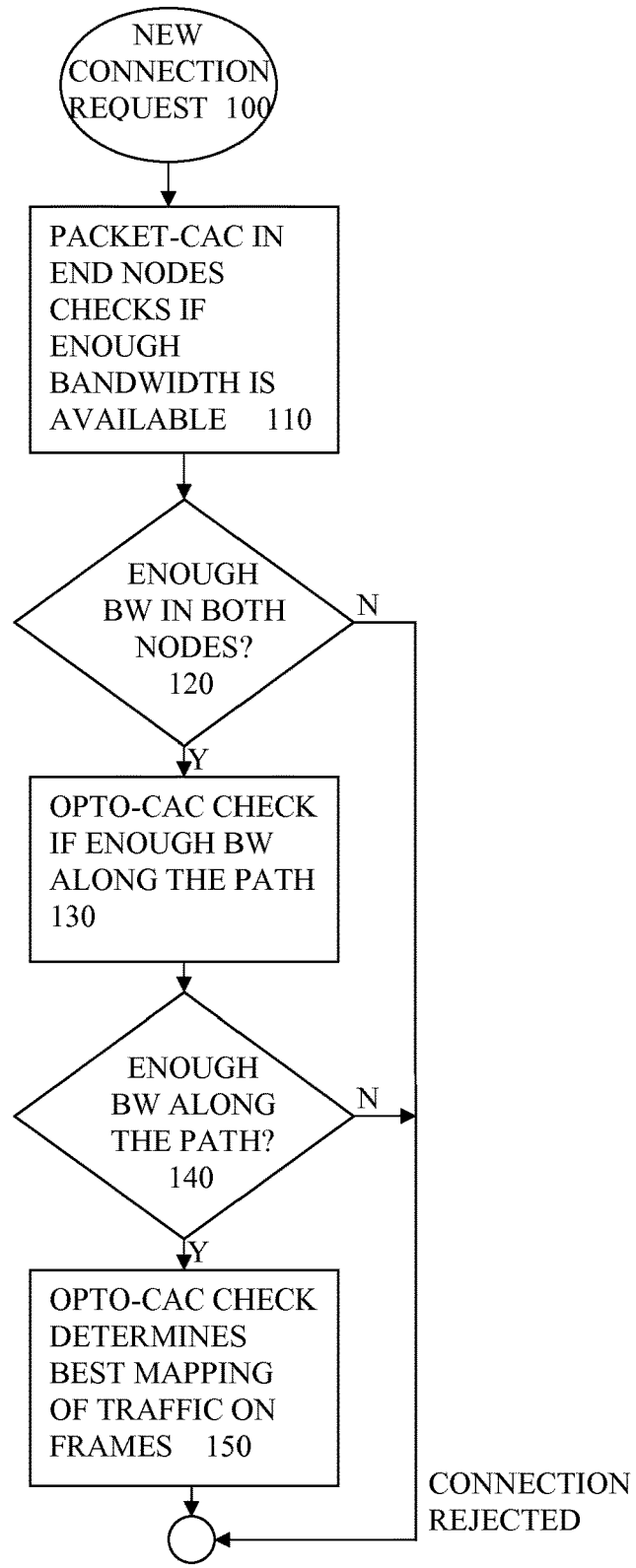

FIG. 8, Packet CAC and Opto CAC

When a new client connection has to be admitted at step 100, first of all, the packet-CAC both at the source and the destination ends of the path are called at step 110 to verify if there is enough bandwidth in their packet switch to host the new connection, satisfying its QoS, loss and delay requirements, while preserving the existing traffic. In case of a positive answer, shown at step 120, the Effective Bandwidth (EB) needed by the new connection is computed as output of this computation. The EB is then used as input by an opto-CAC algorithm at step 130. Since over-provisioning, if allowed, already occurs at packet switch level, a proper choice is to avoid over-provisioning at the optical level. Then, the opto-CAC has to verify at step 140 if, adding the new connection in the optical layer, the bandwidth in the ring is still enough to host all the connections or not. In case of a positive answer, the best mapping to distribute the optical resource among the nodes is determined at step 150 in order to minimize latencies and jitter. The definition of the proper mapping is an operative research task of such a high dimension that typically it can't be solved with traditional approaches. For this reason a new heuristic approach will be used to solve it. In case there isn't enough bandwidth to allocate the new connection properly, the connection is rejected.

Packet-CAC

The packet-CAC has the task of admitting connections locally in the packet switch. Traffic can be of four different types in a typical example (others are possible):

High priority, for signalling for example
RT with guaranteed bandwidth and in some cases a Best Effort component
NRT with guaranteed bandwidth and in some cases a Best Effort component
pure Best Effort.

When admitting a connection each Virtual Connection is described with a set of parameters. In one example embodiment, these are chosen as:

CIR, CBS, PIR,
QoS (High, RT, NRT, BE),
destination IP,
source node index,
destination node index,
multicast index.

The node index is a number identifying the node. The multicast index is used to identify a specific multicast flow. A multicast flow goes from one ingress node to a set of egress nodes placed along the path joining the ingress node to the last egress node along the path. The multicast index is an identification number provided to identify all connections that share the same multicast flow, that means that each of them shares the same ingress node and the same set of egress nodes. A zero multicast index is used, by convention, to identify a unicast flow.

The admission of a connection occurs at both the source and destination nodes and in all dropping nodes in case of multicast. The other nodes are not involved. At the dropping nodes of a multicast flow the same set of Virtual Connection parameters is passed. This is used for egress packet-CAC and in opto-CAC for the final set-up of an RX map. A dropping node infers from the source node index being different from the local one, that it should not admit a new connection. From the presence of a multicast index different from zero, it understands that it has to activate the egress packet-CAC computation to check that the connection can be hosted in the egress direction.

To manage efficiently also the Best Effort component of the traffic a measured based CAC algorithm is introduced. The principle used is to measure on the fly the traffic characteristics in the short term and update the bandwidth allocation accordingly. To allow the estimation of traffic characteristics an ultra-fast traffic model estimator is introduced. The latter updates every T seconds (T depends on self-similar traffic self-correlation properties) the traffic parameters of each connection and provides this information to the packet-CAC for the update.

Figure 9:
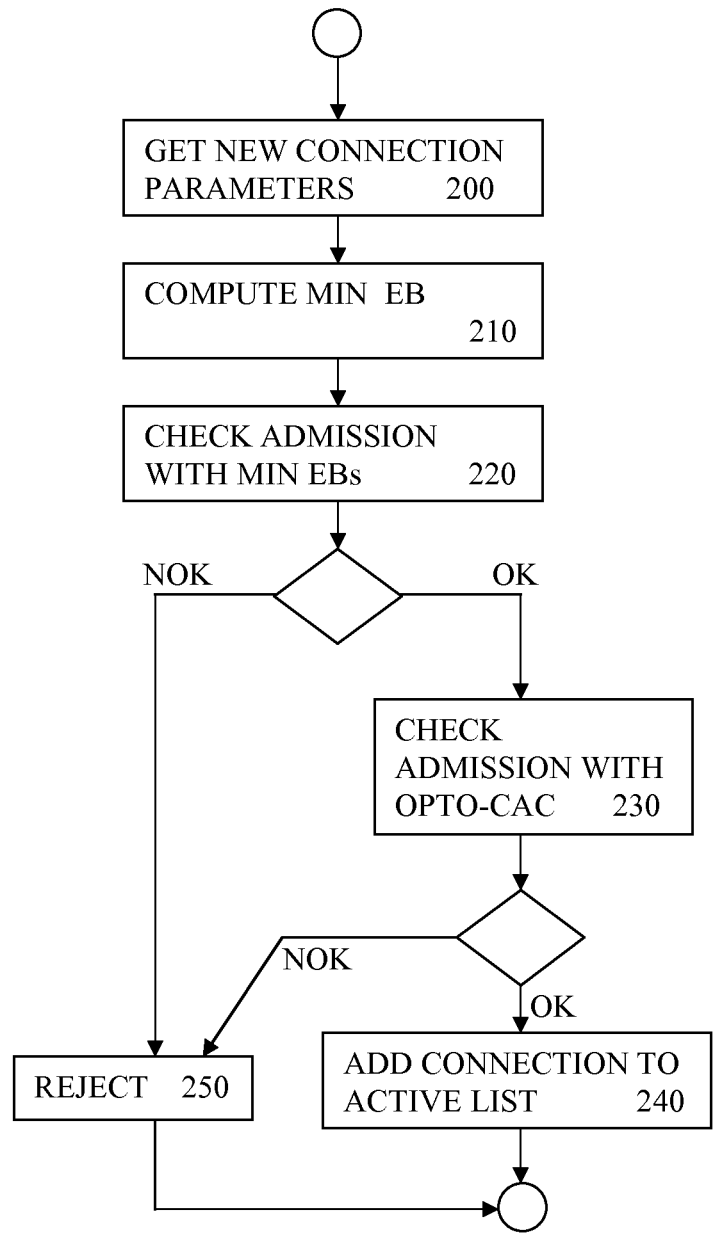
Figure 10:
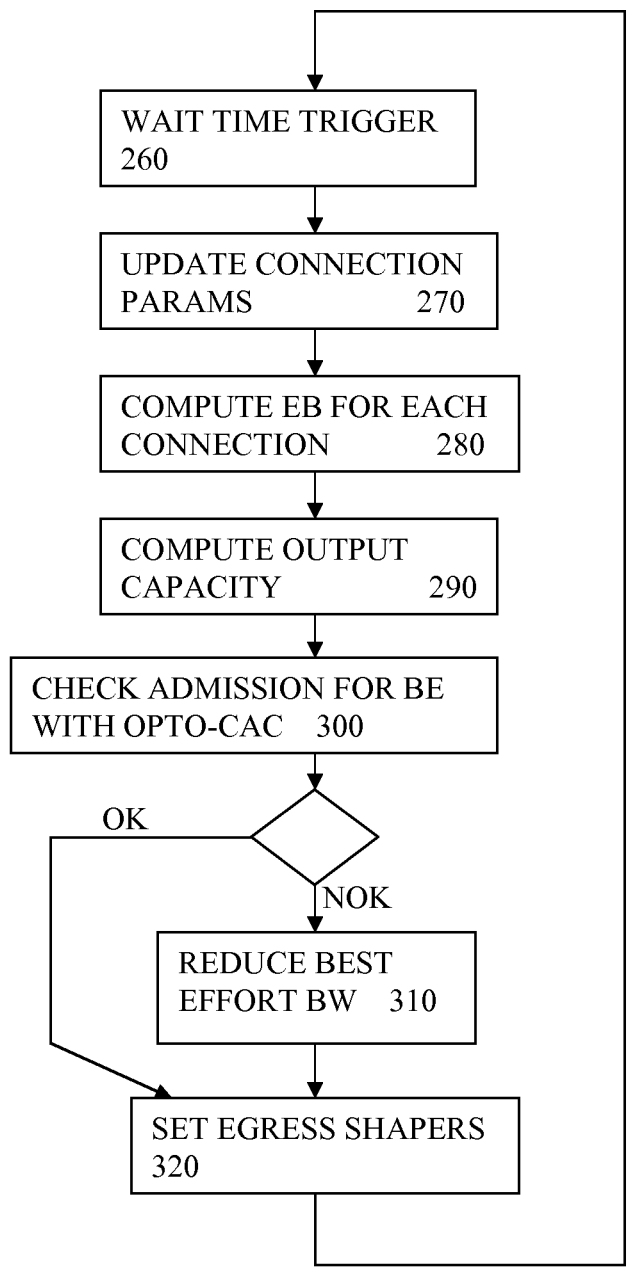

FIGS. 9, 10 Packet-CAC Algorithm

The packet-CAC can be based on an example using the Effective Bandwidth computation formulas described in A. Elwalid et al.: "A New Approach for Allocating Buffers and Bandwidth to Heterogeneous, Regulated Traffic in an ATM Node" IEEE Journal on selected areas in communications vol. 13, No. 6, August 1995, in the case of lossless statistical multiplexing. Lossy statistical multiplexing can introduce an improvement of few points in percentage.

An example of a packet-CAC algorithm is shown in FIGS. 9 and 10. It consists of two parallel tasks. Shown in FIG. 9 is a process used to admit new connections in the system. In FIG. 10 is a process used at run-time to re-compute the EB of each connection and the amount of bandwidth to be allocated at each output port of the packet switch. The functions are explained in the following paragraphs.

MinEB Computing 210

This function, step 210, computes the minimum Effective Bandwidth required by a new connection. The connection parameters used as entry point to this function are PIR, CIR and CBS, obtained at step 200.

For pure Best Effort no computation is needed: the minEB is always zero. Several formulas can be used to compute the minEB for CBR and VBR. In this embodiment we used a formula described in above mentioned Elwalid et al.

$$\begin{cases} \text{min}EB = \dfrac{PIR}{1 + \dfrac{D}{CBS}(PIR - CIR)} & \text{if } CIR \leq \dfrac{CBS}{D} \\ \text{min}EB = CIR & \text{if } \dfrac{CBS}{D} \leq CIR \leq PIR \end{cases}$$

where D is a system parameter providing the maximum queuing delay in the switch. For instance, it can be set to D=250 µs in order to comply with real-time services.

Check Admission with MinEB 220

Once the MinEB is computed for the new connection to be admitted, it must be checked at step 220 if the switch can provide enough bandwidth to support the new service together with the ones already in place. The internal links between the switch and the MAC are n. The connections traveling between the switch and the MAC are distributed between these links in order to have a fair distribution of traffic on them.

Check Admission with Opto-CAC 230

If the packet switch is able to host the new connection, the opto-CAC has to verify its possibility of hosting the new connection in the optical ring. The packet-CAC provides the set of values $$\text{Min}C_{xdm} = \sum_i \text{Min}EB_{ixd}m \quad \forall\, x, d, m$$

with x representing an internal link, d a destination node and m the multicast flow index to the opto-CAC for the computation. As said previously, the opto-CAC is not involved at this level in case of Best Effort connections. BE will receive bandwidth only during run-time execution of the opto-CAC.

The opto-CAC processes the information when it also receives the corresponding information from all the other nodes (vector of minCxdm). The information from the other nodes is provided via in-band signaling using a specific UDP connection routed by the packet switch to the local node controller.

Adding Connection to Active List 240

When the connection is admitted its characteristics (PIR, CIR and CBS), the related MinEB, source and destination nodes and multicast flow index are stored in an active connections table that will be used in the following by the packet CAC both when admitting new connections and when updating on the fly the bandwidth allocation in order to satisfy traffic excess bandwidth demands.

FIG. 10

FIG. 10 shows a process used at run-time to re-compute the EB of each connection and the amount of bandwidth to be allocated at each output port of the packet switch, to adapt to changing bandwidth demands. There is a waiting at step 260 for a period before doing an update. At step 270 update connection parameters are obtained. At step 280 the EB is computed for each connection. An output capacity is determined at step 290. Admission by the opto CAC is checked at step 300, and if failed, then at step 310, an amount of best effort traffic is reduced at step 310. In either case, at step 320 the egress shapers of the packet switch are set. Each of these steps is now described in more detail.

Wait for the Trigger 260

This block introduces a waiting time in order to update the bandwidth allocations with a specific pace. The latter depends on the time needed to collect new measurements on traffic in order to estimate its characteristics. The latter depends on the time interval during which the short term distribution of self-similar traffic is stable.

Update Connection Parameters 270

When the waiting time expires, the program gets the information by the model estimator related to all the active best effort connections and the connections that have an excess bandwidth quote. For the remaining connections the original parameters and the minEB are used in the following stages.

Compute EB for Each Connection 280

At this point the effective bandwidth for each best effort connection and the connections requiring excess bandwidth is computed using as traffic parameters the ones estimated by the model estimator (EPIR, ECIR, ECBS).

$$\begin{cases} EB = \dfrac{EPIR}{1 + \dfrac{D}{ECBS}(EPIR - ECIR)} & \text{if } ECIR \le \dfrac{ECBS}{D} \\ EB = ECIR & \text{if } \dfrac{ECBS}{D} \le ECIR \le EPIR \end{cases}$$

where D is the system parameter providing the maximum queuing delay in the switch. Equations in this embodiment are the ones proposed in above mentioned Elwalid et al.

At this point there is no need to check again if the all the connections can be admitted at packet-switch level, since the difference between EB and minEB is given by the best effort or excess component that does not have guarantees to be supported. EBs, instead, are needed to check if the opto-CAC can host all the excess and best effort traffic or it must be limited.

Compute Output Capacity 290

The packet-CAC provides the set of values $$C_{xdm} = \sum_i EB_{ixdm} \quad \forall\, x, d, m$$

with x representing an internal link, d a destination node and m the multicast index to the opto-CAC for the computation.

Furthermore the minCxdm values are also provided to opto-CAC to allow computation of the reduction of the best effort quotes in case there is not enough space to host all the current demands.

Check Admission for BE with Opto-CAC 300

The opto-CAC has to verify its possibility of hosting the connections in the optical ring according to data provided by packet-CAC in step 290. The opto-CAC processes the information when it also receives the corresponding information from all the other nodes (vectors of Cxdm and of minCxdm). The information from the other nodes is provided via in-band signaling using a specific UDP connection routed by the packet switch to the local node controller.

Reduce Best Effort BW 310

If the opto-CAC states that there is not enough bandwidth to allocate all the best effort or excess quotes, it reports the maximum Cxdm (MaxCxdm) that can be allocated.

Then the packet-CAC will use it in the next step: set egress shaper.

Set Egress Shaper 320

As last step of the computing cycle, the packet-CAC updates the egress shapers of the packet switch related to the different flows towards the MAC according to the related maxCx provided by the opto-CAC.

Figure 11:
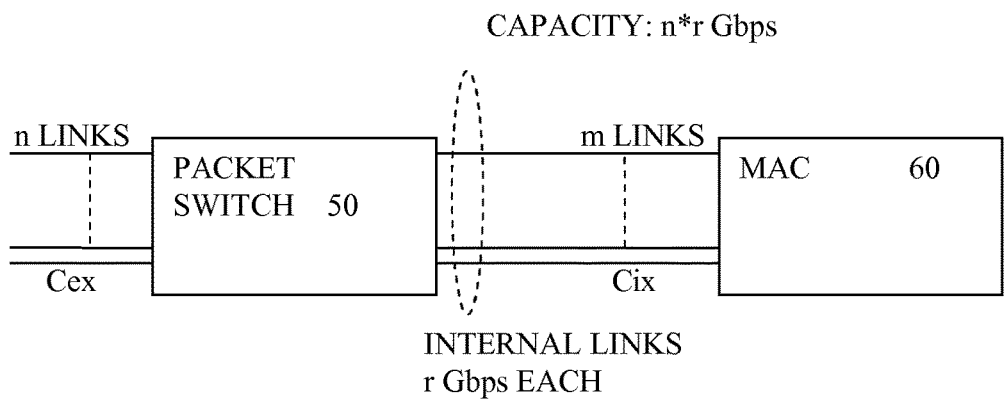
FIG. 11 shows a schematic view of links between a packet switch and a MAC according to an embodiment.

FIG. 11, Internal Links Between Packet Switch 50 and MAC 60

The maximum capacity of each internal link is r Gbps and the total switch capacity in each direction has to be considered n*r Gbps.

Suppose Cix to be the capacity of each internal link and Cex the capacity of each external link (client links).

When a new connection is requested, it has to be verified that there is enough bandwidth to host it on the internal links in both the source and the destination nodes and in egress from the switch of the destination node towards the client line.

In the source node it must be selected the link with the lowest load and it must be verified that:

$$\sum_j MinEB_j < Cix$$

including the new connection, where x refers to the selected internal link (the one with the lowest load).

(If the condition holds it is also automatically verified that $$\sum_j MinEB_j < Cix$$

holds, summing this time the minEB of all the connections going to the same destination passing through the internal link x).

If the condition does not hold, the connection is rejected, otherwise we proceed with the following step verifying the availability of the bandwidth at optical level.

The values that have to be passed to the opto-CAC for the computation are the set of values $$MinC_{xdm} = \sum_i MinEB_{ixdm} \quad \forall\, x, d, m$$

with x representing an internal link, d a destination node and m the multicast flow (zero is the unicast flow).

Since pure Best Effort connections have MinEB=0, they are always admitted at packet-CAC level and are not taken into account in the opto-CAC at this point.

So in case a Best Effort connection has to be admitted, there is no need of checking anything.

At the destination node or multicast dropping nodes, during packet-CAC admission check, it is enough to verify that $$\sum_i \text{Min}EB_{ix} < Cex$$

including the new connection, where x refers to the selected external link to the client is lower than the external link capacity (Cex=s Gbps).

If the condition holds the connection is admitted, otherwise it is rejected.

For multicast connections the following cases can occur:
The current node is the source node; in this case the procedure is the same as described before.
The current node is the final destination; the procedure is the same as before
The current node is a transit node where no drop has to occur; nothing to do.
The current node is a transit node where drop occur; the same check as in the destination node has to occur.

Figure 12A:
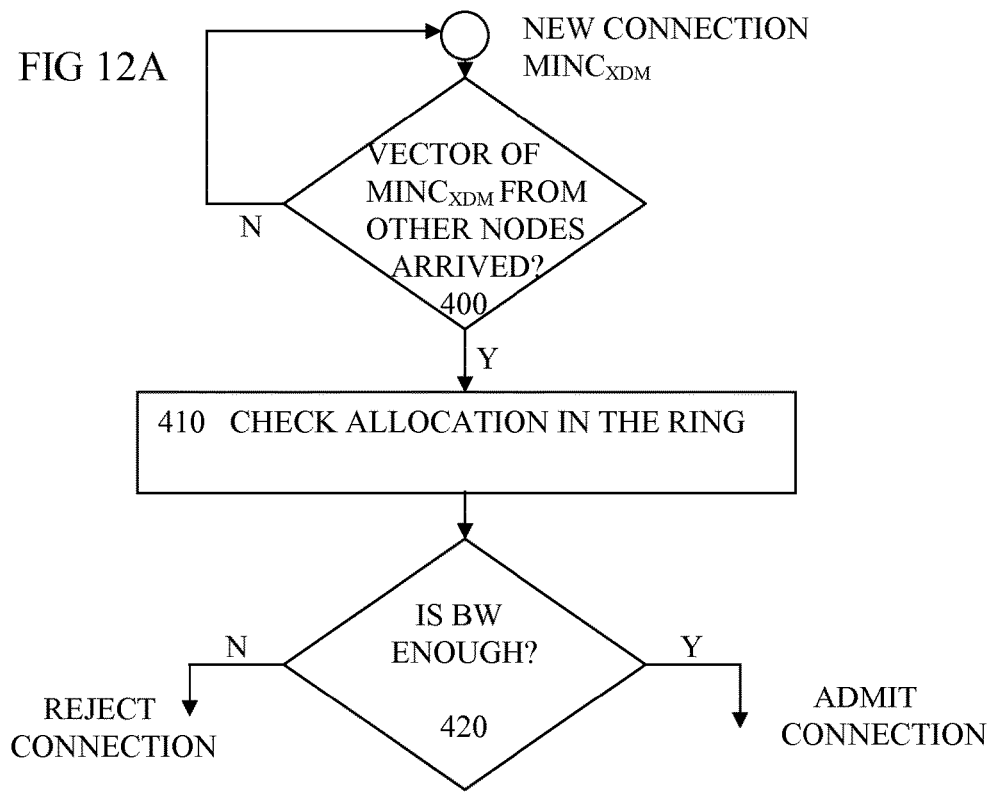

FIG. 12A Initial Opto-CAC Operation Summarised

As soon as the opto-CAC receives at step 400 all the information to be processed, it checks at step 410 if it can allocate all the required bandwidth into the ring. If there is enough bandwidth, the connection can be admitted at step 420, otherwise it is rejected.

FIG. 22B Opto-CAC for BE Operation Summarised

As soon as the opto-CAC receives at step 430 all the information to be processed, it checks at step 440 if it can allocate all the required bandwidth into the ring. If there is enough bandwidth, at step 445 the required connection bandwidth can be provided, otherwise the connection bandwidth is reduced.

FIGS. 13 to 15

An example of an algorithm used to allocate the bandwidth onto the ring is described in FIGS. 13 to 15. It is executed in parallel in each node. As a result, traffic maps, consisting of a series of temporal slots, are generated. The slots are sub-multiple of the RTT to allow a steady distribution of time windows onto the ring.

The algorithm starts allocating the slots to the different flows starting from one reference node, e.g. node 0. Traffic flows are characterized by their effective bandwidth in slots and their source and destination nodes. For each flow the distance of the destination node from the current one is computed and only the flows with a positive distance are taken into account. They are listed in decreasing distance order so to process in forward direction the ones with the longest path first. Once the forward map from the current node to the next is built, the reserved slots are projected onto the following maps up to the reaching of the destination node corresponding to each associated flow. For each updated map a corresponding list of free slots is computed.

In the same way, for the flows crossing the node the slots allocated in the map between the current node and the next are projected back on the previous maps up to the source nodes of each involved flow. The procedure is then repeated for the next nodes with the constraint of avoiding slots already allocated. The procedure ends when all nodes are visited. With this procedure it could occur that flows handled later have difficulties in finding a contiguous allocation of slots, since, during the progress of the computation, the number of free slots in each map will decrease.

Each map is represented as a matrix r×c with a total on N entries. Slots are divided in r rows and c columns. Rows are equal to the number of available wavelengths, whereas columns are equal to the number of slots per wavelength. Such number is chosen, as said previously, so that the slot time is a sub-multiple of the RTT.

Naming:
Fi as flow i
Si as source of the flow i
Di as destination for the flow i
EBWi effective BW for the flow i
Tj as one moment in time, corresponding to the crossing of node j $$EffBWtot = \sum_i EffBW_i <= N$$

with N the total number of slots per map
Mxy is the slot located in xth row and yth column of the matrix representing a map; each row has r machines and each column c machines Consider guaranteed bandwidth flows (in case split each flow into two flows one for guaranteed and the other for BE quotes)

As shown in step 450, the process starts with a matrix in time 0 (Node T0). Active flows are ordered in decreasing distance from destinations as shown in step 460. At step 470 for each flow we compute burst size considering desired time gap or equi-distributing flow bursts along frame.

Step 480 shows defining TotGapi size is c-EffBWi. Desired gap is Gi depending on admitted jitter. If maximum allowed jitter is 250 us and the slot size lasts 2 us, the gap can't be more than allowedJitter/slotSize=125 slots. So Gi<=125=Mjiti (maxJitter for flow i).

At step 490, NGi<=totGapi/Mjiti=(c-EffBWi)/Mjiti number of gaps=number of bursts for flow i. At step 500, we define NBi=NGi Number of bursts for flow I, and BSi=EffBWi/NBi Burst size flow i. Each flow i is divided in NBi subflows of size BSi at step 510. Subflows are ordered in inverse size order at step 520. At step 530, each subflow is assigned to a set of consecutive slots. If this is not possible then the first available slot is used.

Following subflows are assigned at step 540 to consecutive rows of slots starting from the last used column position plus the next gap (in this phase the matrix is considered as circular). At step 550, we project forwards and backwards the assigned slots in other status matrices (up to destination and source nodes respectively). At step 560, the process moves to next time instant (node); repeat avoiding usage of already assigned slots.

The process continues in FIG. 14 where excess traffic allocation begins with step 570 where a maximum excess BW per hop for each flow is computed. At step 580, a minimum BW per flow available along their paths is computed. At step 590, we assign to each flow the lowest value between the required one (input from measurements and packetCAC (0 if no data available)) and the min BW available along the path.

For each connection, at step 600: we set a minimum gap between bursts to 0, we set Number of bursts equal to the number of slots corresponding to the flow BW (in slots), set burst size=1 slot. The matrices T listing available slots for each hop are defined at step 610. At step 620, we create the matrix of flows ordered list. There is one list per row. Each row refers to a hop and it is associated to the node from where the hop begins. At step 630 we create the flowsTo-Handle list for excess traffic. The process continues in FIG. 15. At step 650, for each flow we assign one available slot at the time along its path from source to destination; and continue adding slots to each flow until the number of slots required by the flow are all assigned or there are no more available slots along the path to be assigned.

At step 660 we select the map associated to the node as the TX map. At step 670, for each slot of the TX map if the associated flow has as source node the current node, we set the value to the couple (linkID, flow destination node index—current node index −1). Otherwise we set the value to the couple (linkID, row value); (the row value corresponds to the wavelength index) (the node index has to be handled in circular way). LinkID from 0 to N refers to electrical client links; the LinkID N+1 refers to optical link.

At step 680 we select the map associated previous node (in circular way) as the RX map. At step 690, for each slot of the RX map if the associated flow has as destination node the current node or that flow is handled as multicast in the current node set the value to 1. Otherwise it is set to 0. Finally at step 700 we report the TX and the RX map and the list of actual assigned BW in slots for each excess flow to be used in the CAC and in metering for dynamic computation.

FIG. 16 MAC Architecture

The MAC handles the dynamic bandwidth allocation at node level according to the bandwidth distribution determined by the opto-CAC. An example of a node showing more details of MAC architecture is shown in FIG. 16 in case of two optical links, but it is not limited to this configuration. The MAC can have both control-plane (MAC controller 730) and data-plane functionalities.

It is controlled by a "node controller" 710 that can generate the mapping of time slots and coordinates the transfer of maps information between the CAC and the MAC. Two TX maps 750 and 760 are shown. Two RX maps 770 and 780 are shown. This enables one of the pair of maps to be generated while the other is unchanged while it is used for controlling the burst switch. The framing detector 720 is used to align its slot counter to the network so that all nodes in the ring are properly slot synchronized. An opto-classifier 810 selects which of the queues 820 to use for each traffic flow of the client traffic coming from the router 790. The classifier can contain an association table that maps destination IP addresses, for instance, into traffic flows (connection groups) and consequently into the proper queues.

A queue is defined for each connection group. So a queue contains the packets related to connections sharing the same path from source to destination nodes including the possible intermediate dropping points, in case of multicasting.

There are schedulers 830 coupling the queues to burst assemblers 840. The burst assemblers feed bursts of the traffic flows to the OEO switch 800, controlled by the MAC controller. The latter informs the schedulers when they are eligible for transmission and for how long, the burst duration. At the same time the MAC controller configures the burst switch consistently to create the right path from the scheduler to the optical output link for each time slot according to the mapping of bursts to time slots. Furthermore the MAC controller provides some signalling information to be put in the header of the burst like the slot number. The latter information is used to maintain the proper slot alignment in the network.

Each scheduler, when activated by the MAC, before sending a packet checks if there is still enough space in the burst to transmit it. In case the burst is full the packet is not transmitted and waits for the next burst.

The MAC controller activates the schedulers and configures the OEO switch on the basis of the TX map. The RX map, instead, is used to decide when to configure the OEO switch to send the burst out towards the router (dropping). When dropping occurs the burst header is removed before reaching the router.

Two TX and RX maps are provided. One TX and one RX maps are in service, while the others are in stand-by state. This allows the node controller to configure the stand-by maps with the data provided by the CAC without affecting traffic. A specific procedure is used to commute the maps to avoid traffic glitches.

The parts of the node which are examples of the apparatus 5 for configuring the node are shown within a dashed-dotted line, in this case the CAC 10, the node controller 710, and the maps 750, 760, 770, 780. As in FIG. 2, the CAC is not essential, or can be implemented elsewhere.

Figure 17:
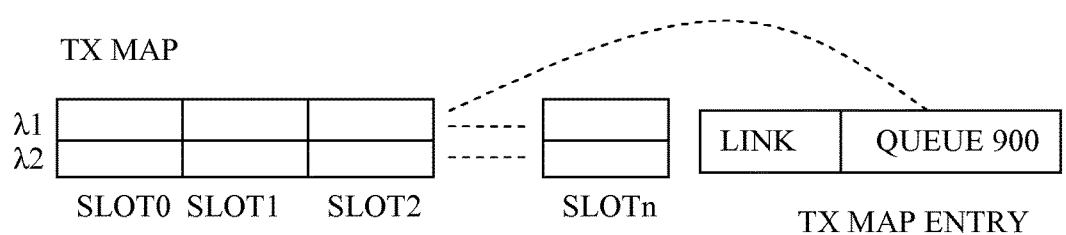
FIGS. 17 and 18 show schematic views of maps of time slot allocations for outward going TX traffic flows and inward coming Rx traffic flows respectively.
Figure 18:
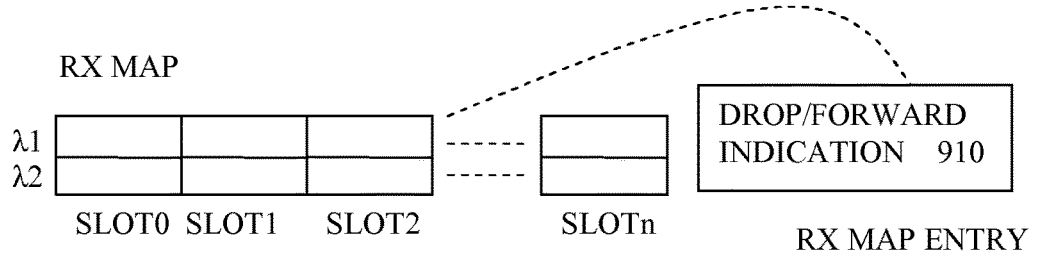

FIGS. 17 and 18 TX and RX Maps in MAC

The content of the TX and RX tables is arranged as follows. They consist of a row for each available wavelength and a column for each transmission time window (slot). In an embodiment, the TX map each entry (slot) contains two fields: (link, queue). Link refers to internal electrical links coming from the client side or to incoming optical links. The numbering follows this rule: if there are x internal links and y incoming optical links, the numbers from 0 to x−1 refer to internal links and from x to x+y−1 to optical links.

The queue field reports the queue, related to the selected link, from which the traffic will be transferred. In case the source is an incoming optical link, the queue field is left equal to zero. The queues range is [0,w]. In the current implementation, where the network will use 3 nodes, w=2, where 0 means the queue related to the next node, 1 the queue related to the following one and 2 refers to a multicast connection reaching both. Queues can also be seen as connection groups, where each group has in common the same optical path, including the same dropping points in case of multicast connections.

The RX map has the same organization as the TX map, but each entry (slot) contains a single field with Boolean value. A zero value stands for forwarding, whereas a 1 value states that dropping has to occur.

Map Change Method

Periodically maps have to be changed to introduce a new bandwidth distribution inside the ring network in order to follow traffic demands. The update of maps has to occur in a proper sequence in order to avoid temporary glitches on the traffic.

Maps are independently computed at each node on the basis of effective BW needed by all the connections in the network. Periodically each node, using signalling, sends its need of bandwidth for each connections group to all the other nodes. Then each node computes its TX/RX maps on its own and, when ready, it can update the current ones. The updating has to occur in a specific sequence among the nodes in order to avoid temporary services disturbance. For this reason a commutation protocol at low level is needed and a proper control by each node of the new values activation sequence for both TX and RX maps.

When all nodes are ready for commuting, each one changes the maps as soon as it receives the commuting signal. A proper commutation of each entry of the TX/RX maps has to occur to avoid collisions and mis-insertions. This is a situation that can occur in ring topologies.

When a node receives the commutation signal it has to take into account its position in the network to know which nodes are already ready to commute and how many nodes still have to receive the signalling. Furthermore it has to take into account the previous allocation of slots to the different source nodes so to commute a TX slot only when all the burst transmitted previously by the other nodes using that slot and crossing the node have crossed the node. A similar mechanism applies also to the RX map.

Suppose that x represents the index of the current node. X is an integer ranging in [0,N−1] where N is the cardinality of the ring network. Then, the node x can commute slot y only when the burst coming from node z, that was using previously the slot, passed. So commutation can occur:

Immediately if x−z>0 (the source node z received commuting signal before the current node x)

After 1 roundtrip if x−z<0 (the source node z will receive the commuting signal after the current node x); after one round also the following source nodes are all updated.

The same mechanism can be applied also to RX maps.

CONCLUDING REMARKS

As has been described, a node for burst switching of traffic flows in an optical network switches bursts of traffic flows in different time slots. Time slots are allocated (96) so that a time gap between successive allocated time slots is selected according to a jitter specification of the traffic flow. A map of the allocations controls a burst switch to pass the bursts in their allocated time slots (86). By making the time gap between allocated time slots for successive bursts selectable, the jitter can be controlled more precisely, or the proportion of time slots filled can be increased resulting in better utilisation of available bandwidth. The allocation can be made hop by hop. The map can be generated in a distributed and duplicated manner at each node. The allocation can be updated to adapt to changes bandwidth demands.

Embodiments as described can be applied in managing of telecom-grade traffic in ring networks. This is an emerging need for WDM transport networks and, specifically, mobile backhaul ones, where LTE and LTE advance traffic should be hosted. The introduction of a new type of CAC, working in an integrated manner both at packet and optical level, to provide dynamically bandwidth allocations in the short term on the basis of the traffic forecasts made by real-time modellers, allows the bandwidth allocation process to be separated from the runtime traffic mapping made by MAC on the optical link. This mechanism eliminates both the problems that can be found using one-way and two-way reservation schemes. For example each traffic flow can have a dedicated portion of bandwidth without the need of stealing it from other flows. Each traffic flow doesn't have to wait for a new bandwidth allocation each RTT, avoiding an additional jitter equal to one RTT. As a typical network can have RTT of the order of magnitude of 1-2 ms, that is incompatible with RT services. The mechanism can also be extended to BE traffic at run-time to obtain the same advantages also in this case.

The combination of the packet-CAC, the heuristic slots allocation by opto-CAC and the separation of CAC bandwidth allocation and MAC runtime slots allocation, allows for a more strict control of latency and jitter injected by each node. The maximum acceptable jitter for each service can be decided by the operator and is no longer network dependent. The maximum jitter allowed can be chosen per CoS.

Traffic characteristics can be preserved by the proper bandwidth allocation and management performed by CAC and MAC both at packet and optical level. The opto-CAC method and the MAC architecture allow hop by hop wavelength reuse, increasing significantly the amount of traffic that can be hosted in the network. The proposed node and its mechanisms can reach efficiency in terms of optical bandwidth exploitation of greater than 95%. By having signalling traveling in-band and requiring fewer kbps, there is no longer a need to use a complete wavelength for signalling.

The invention claimed is:

1. A method of configuring a node for burst switching of traffic flows in an optical network, having the steps of:
    receiving indications relating to a traffic flow to be scheduled comprising at least an indication of a destination node and of a jitter specification for the traffic flow, the traffic flow comprising a series of bursts;
    allocating bursts of that traffic flow to time slots of at least one optical network frame having a destination corresponding to the indicated destination node of the traffic flow, wherein a time gap between successive allocated time slots is selected according to the jitter specification of the traffic flow; and
    configuring the node, before the traffic flow arrives at the node, to enable the node to switch the bursts towards the respective destination node in their allocated time slots;
    wherein the method further includes the subsequent step of repeatedly adapting the allocation of the bursts of the traffic flow and allocations of bursts of other existing traffic flows in the optical network.

2. The method of claim 1, having the step of:
    receiving an indication of a desired bandwidth for the traffic flow,
    wherein the step of allocating comprises:
    selecting time slots in a given time period to allocate, and selecting optical wavelengths to be used, according to the desired bandwidth.

3. The method of claim 1, where the traffic flow is routed over more than one hop via an intermediate node to reach the destination node, and wherein the step of allocating comprises allocating time slots for each of the hops.

4. The method of claim 3, having a step of providing optical termination and regeneration at the intermediate nodes.

5. The method of claim 1, the allocating being distributed and duplicated at multiple nodes of the optical network by having a step at the node of generating maps of allocated time slots for traffic flows at the node and for traffic flows at others of the nodes, and having the step of generating duplicate maps at the others of the nodes.

6. The method of claim 5, the generating of the maps comprising allocating time slots relating to traffic flows of a selected reference one of the nodes, then allocating time slots for these same traffic flow in the maps for respective nodes upstream and downstream of the reference node, and then repeating these steps for traffic flows of another of the nodes in a predetermined order while avoiding time slots already allocated.

7. The method of claim 1, having the steps of dividing the traffic flow into bursts and selecting a burst size according to the selected time gap.

8. The method of claim 1, further comprising performing an admission control procedure that includes determining whether there is sufficient bandwidth in packet switches at ingress and egress to the optical network, and whether there is sufficient bandwidth within the optical network.

9. Apparatus for configuring a node for burst switching of traffic flows in an optical network, the apparatus having:
- an input configured to receive indications relating to a traffic flow to be scheduled comprising at least an indication of a destination node and of a jitter specification for the traffic flow, the traffic flow comprising a series of bursts; and
- a processor configured to allocate bursts of that traffic flow to time slots of at least one optical network frame having a destination corresponding to the indicated destination node of the traffic flow, wherein the processor is configured to select a time gap between successive allocated time slots according to the jitter specification of the traffic flow, and to configure the node before the traffic flow arrives at the node, to enable the node to switch the bursts towards the respective destination node in their allocated time slots;
- wherein the processor is further configured to adapt repeatedly the allocation of the bursts of the traffic flow and allocations of bursts of other existing traffic flows in the optical network.

10. The apparatus of claim 9, configured to receive an indication of a desired bandwidth for the traffic flow and to select how many of the time slots in a given time period to allocate, and to select which optical wavelengths are to be used, according to the desired bandwidth.

11. The apparatus of claim 9, where there are multiple hops via intermediate nodes to reach the destination node, and wherein the processor is configured to allocate time slots for each of the multiple hops, the intermediate nodes being arranged to provide optical termination and regeneration.

12. An optical network having multiple nodes, each having apparatus for configuring a node for burst switching of traffic flows in an optical network, where the apparatus includes an input configured to receive indications relating to a traffic flow to be scheduled comprising at least an indication of a destination node and of a jitter specification for the traffic flow, the traffic flow comprising a series of bursts, and a processor configured to allocate bursts of that traffic flow to time slots of at least one optical network frame having a destination corresponding to the indicated destination node of the traffic flow, wherein the processor is configured to select a time gap between successive allocated time slots according to the jitter specification of the traffic flow, to configure the node before the traffic flow arrives at the node, to enable the node to switch the bursts towards the respective destination node in their allocated time slots, and to adapt repeatedly the allocation of the bursts of the traffic flow and allocations of bursts of other existing traffic flows in the optical network, the allocating being distributed and duplicated at the multiple nodes, the nodes each being configured to generate maps of allocated time slots for their traffic flows and for traffic flows of others of the nodes, to provide duplicate maps at the nodes for use in optical burst switching of the traffic flows.

13. A non-transitory computer-readable medium storing a computer program comprising program instructions that, when executed by a processor of a node configured for operation in an optical network, configure the node for burst switching of traffic flows in the optical network, based on the computer program comprising program instructions configuring the node to:
- receive indications relating to a traffic flow to be scheduled comprising at least an indication of a destination node and of a jitter specification for the traffic flow, the traffic flow comprising a series of bursts;
- allocate bursts of that traffic flow to time slots of at least one optical network frame having a destination corresponding to the indicated destination node of the traffic flow, wherein a time gap between successive allocated time slots is selected according to the jitter specification of the traffic flow;
- configure the node, before the traffic flow arrives at the node, to enable the node to switch the bursts towards the respective destination node in their allocated time slots; and
- adapt repeatedly the allocation of the bursts of the traffic flow and allocations of bursts of other existing traffic flows in the optical network.

* * * * *